US012734836B2

(12) United States Patent
Tsukuda et al.

(10) Patent No.: US 12,734,836 B2
(45) Date of Patent: Sep. 15, 2026

(54) PRINTING APPARATUS

(71) Applicant: CANON KABUSHIKI KAISHA, Tokyo (JP)

(72) Inventors: Masakazu Tsukuda, Kanagawa (JP); Yukimichi Kimura, Kanagawa (JP); Kyohei Sato, Kanagawa (JP); Shingo Horita, Kanagawa (JP); Toshiki Hamanishi, Kanagawa (JP); Yusuke Nishiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 18/457,275

(22) Filed: Aug. 28, 2023

(65) Prior Publication Data

US 2024/0075758 A1 Mar. 7, 2024

(30) Foreign Application Priority Data

Sep. 5, 2022 (JP) ................................ 2022-140859
Sep. 5, 2022 (JP) ................................ 2022-140869

(51) Int. Cl.
*B41J 19/20* (2006.01)
*B41J 19/30* (2006.01)
(Continued)

(52) U.S. Cl.
CPC ........... *B41J 25/006* (2013.01); *B41J 19/202* (2013.01); *B41J 19/305* (2013.01); *B41J 23/02* (2013.01)

(58) Field of Classification Search
CPC ...... B41J 25/006; B41J 19/202; B41J 19/305; B41J 23/02
See application file for complete search history.

(56) References Cited

U.S. PATENT DOCUMENTS 11,090,954 B2 8/2021 Emoto et al.
2007/0048058 A1* 3/2007 Koga .................... B41J 11/485 400/283
(Continued)

FOREIGN PATENT DOCUMENTS

CN 105172391 A 12/2015
CN 110549733 A 12/2019
(Continued)

OTHER PUBLICATIONS

U.S. Appl. No. 18/357,062, filed Jul. 21, 2023.
(Continued)

*Primary Examiner* — Yaovi M Ameh
(74) *Attorney, Agent, or Firm* — Venable LLP

(57) ABSTRACT

An embodiment of the present invention is a printing apparatus, comprising: a carriage on which a printing head is mounted and that can move reciprocally in a first direction; a motor configured to generate driving force; a driving shaft extending in the first direction and driven to rotate by the driving force; a plurality of driving units driven by the driving force transmitted through the driving shaft; a switching unit configured to switch a transmission destination of the driving force in the plurality of driving units in conjunction with the driving shaft; and a contact unit configured to rotate around a rotatably supporting unit so as to be in a contact position in which contact with the carriage is made or a non-contact position in which the contact with the carriage is not made and to move with the carriage in the contact position.

14 Claims, 22 Drawing Sheets

(51) Int. Cl.

| | |
|---|---|
| ***B41J 23/02*** | (2006.01) |
| ***B41J 25/00*** | (2006.01) |

(56) References Cited

U.S. PATENT DOCUMENTS

| | | | | |
|---|---|---|---|---|
| 2009/0035018 | A1* | 2/2009 | Koga ........................ | B41J 29/38<br>399/167 |
| 2009/0284565 | A1* | 11/2009 | Shinagawa .............. | B41J 11/42<br>74/665 G |
| 2014/0318922 | A1 | 10/2014 | Shinagawa et al. .... | F16D 11/14 |
| 2015/0022577 | A1 | 1/2015 | Hakamata | |
| 2016/0236489 | A1 | 8/2016 | Nakano | |
| 2018/0037040 | A1 | 2/2018 | Koga | |

FOREIGN PATENT DOCUMENTS

| | | | | | |
|---|---|---|---|---|---|
| EP | 0311980 | A2 | | 4/1989 | |
| EP | 2156960 | A | | 2/2010 | |
| JP | 2009-274304 | | | 11/2009 | |
| JP | 2010-017993 | | | 1/2010 | |
| JP | 2010017993 | A | * | 1/2010 | .............. B41J 23/02 |

OTHER PUBLICATIONS

Office Action dated Apr. 15, 2026, in Chinese Patent Application No. 202311114148.3.

Office Action dated Jul. 21, 2026, in Japanese Patent Application No. 2022-140869.

* cited by examiner

| | PUSHING POSITION OF PLANETARY GEAR 633 | | |
|---|---|---|---|
| SUPPORTING SHAFT 501 | C1: NOT ENGAGED WITH INPUT GEAR → PLANETARY ARM CAN PIVOT (FIG. 8C) | B1: ENGAGED WITH SECOND FEEDING INPUT GEAR 621 → SECOND FEEDING IS POSSIBLE (FIG. 8B) | A1: ENGAGED WITH MAINTENANCE INPUT GEAR 651 → MAINTENANCE IS POSSIBLE (FIG. 8A) |
| SUPPORTING SHAFT 502 | C2: NOT ENGAGED WITH INPUT GEAR → PLANETARY ARM CAN PIVOT (FIG. 9A) | B2: ENGAGED WITH SECOND FEEDING INPUT GEAR 621 → SECOND FEEDING IS POSSIBLE (FIG. 9B) | A2: ENGAGED WITH SUN GEAR 632 BUT NOT ENGAGED WITH ANOTHER GEAR → DISCONNECT DRIVE TRANSMISSION FOR SECOND FEEDING (FIG. 9C) |
| SUPPORTING SHAFT 503 | C3: NOT ENGAGED WITH INPUT GEAR → PLANETARY ARM CAN PIVOT (FIG. 10A) | B3: ENGAGED WITH FIRST FEEDING INPUT GEAR 15 → FIRST FEEDING IS POSSIBLE (FIG. 10B) | A3: ENGAGED WITH SUN GEAR 632 BUT NOT ENGAGED WITH ANOTHER GEAR → DISCONNECT DRIVE TRANSMISSION FOR FIRST FEEDING (FIG. 10C) |

FIG.16

| | PUSHING POSITION OF PLANETARY GEAR 633 | | |
|---|---|---|---|
| SUPPORTING SHAFT 501 | C1: NOT ENGAGED WITH INPUT GEAR → PLANETARY ARM CAN PIVOT | B1: ENGAGED WITH FIRST FEEDING INPUT GEAR 15 → FIRST FEEDING IS POSSIBLE | A1: ENGAGED WITH MAINTENANCE INPUT GEAR 651 → MAINTENANCE IS POSSIBLE |
| SUPPORTING SHAFT 502 | C2: NOT ENGAGED WITH INPUT GEAR → PLANETARY ARM CAN PIVOT | B2: ENGAGED WITH SECOND FEEDING INPUT GEAR 621 → SECOND FEEDING IS POSSIBLE | A2: ENGAGED WITH SUN GEAR 632 BUT NOT ENGAGED WITH ANOTHER GEAR → DISCONNECT DRIVE TRANSMISSION FOR SECOND FEEDING |
| SUPPORTING SHAFT 503 | C3: NOT ENGAGED WITH INPUT GEAR → PLANETARY ARM CAN PIVOT | B3: ENGAGED WITH FIRST FEEDING INPUT GEAR 15 → FIRST FEEDING IS POSSIBLE | A3: ENGAGED WITH SUN GEAR 632 BUT NOT ENGAGED WITH ANOTHER GEAR → DISCONNECT DRIVE TRANSMISSION FOR FIRST FEEDING |

FIG.17

PRINTING APPARATUS

BACKGROUND

Field

The present disclosure relates to a printing apparatus that prints an image on a printing medium, and particularly relates to an image printing apparatus including multiple driving units and a drive transmission switching unit that selectively switches the drive.

Description of the Related Art

As a conventional image printing apparatus, there has been known an image printing apparatus that includes one driving source and multiple driving units and performs a switching operation to selectively drive one of the multiple driving units.

Japanese Patent Laid-Open No. 2010-17993 (PTL 1) discloses an image printing apparatus as illustrated in FIG. 11 of the present specification. In this image printing apparatus, a carriage comes in contact with a rotatably formed switching lever to move the switching lever in an axial direction. This makes it possible to move a switching gear arranged in the center of the rotation of the switching lever to a position in which the switching gear is engaged with a gear of one of the multiple driving units to which the driving force is transmitted. Note that, during the printing of an image onto the printing medium, the switching lever is in a position withdrawn from the carriage. Therefore, the carriage receives no impact, and thus there is no obstacle to the printing operation.

SUMMARY

However, in Japanese Patent Laid-Open No. 2010-17993, as more driving units are provided, the gears as an input destination have to be arranged along a movement direction of the carriage, and this increases the width of the image printing apparatus. Therefore, it is necessary to move the switching gear rotatably supported in parallel to a scanning direction of the carriage to a position in which the switching gear is engaged with the driving force input destination gear of one of the multiple driving units to which the driving force is intended to be transmitted.

Given the circumstances, in light of the above-described problem, the present disclosure relates to a drive switching operation to select and drive one of multiple driving units, and an object thereof is to achieve downsizing as compared with the conventional technique.

An embodiment of the present invention is a printing apparatus, including: a carriage on which a printing head is mounted and that can move reciprocally in a first direction; a motor configured to generate driving force; a driving shaft extending in the first direction and driven to rotate by the driving force; a plurality of driving units driven by the driving force transmitted through the driving shaft; a switching unit configured to switch a transmission destination of the driving force in the plurality of driving units in conjunction with the driving shaft; and a contact unit configured to rotate around a rotatably supporting unit so as to be in a contact position in which contact with the carriage is made or a non-contact position in which the contact with the carriage is not made and to move with the carriage in the contact position, in which the switching unit switches the transmission destination of the driving force by a movement unit moved by the movement of the contact unit.

Further features of the present invention will become apparent from the following description of exemplary embodiments with reference to the attached drawings.

BRIEF DESCRIPTION OF THE DRAWINGS

FIG. 13 is perspective views and schematic views illustrating the switching operation relevant to a supporting shaft according to an embodiment of the present invention by illustrating an engagement relationship of a planetary gear and the like;

FIG. 14 is perspective views and schematic views illustrating the switching operation relevant to another supporting shaft according to the embodiment of the present invention by illustrating an engagement relationship of the planetary gear and the like;

FIG. 15 is perspective views and schematic views illustrating the switching operation relevant to still another supporting shaft according to the embodiment of the present invention by illustrating an engagement relationship of the planetary gear and the like;

FIG. 16 is a diagram illustrating a relationship between the supporting shafts and planetary gear pushing positions to describe driving force transmission switching by the driving force transmission unit;

FIG. 17 is a diagram illustrating a relationship between the supporting shafts and the planetary gear pushing positions to describe another example of the driving force transmission switching by the driving force transmission unit;

DESCRIPTION OF THE EMBODIMENTS

Embodiments of the present disclosure are described below in detail with reference to the drawings.

First Embodiment

Figure 1:
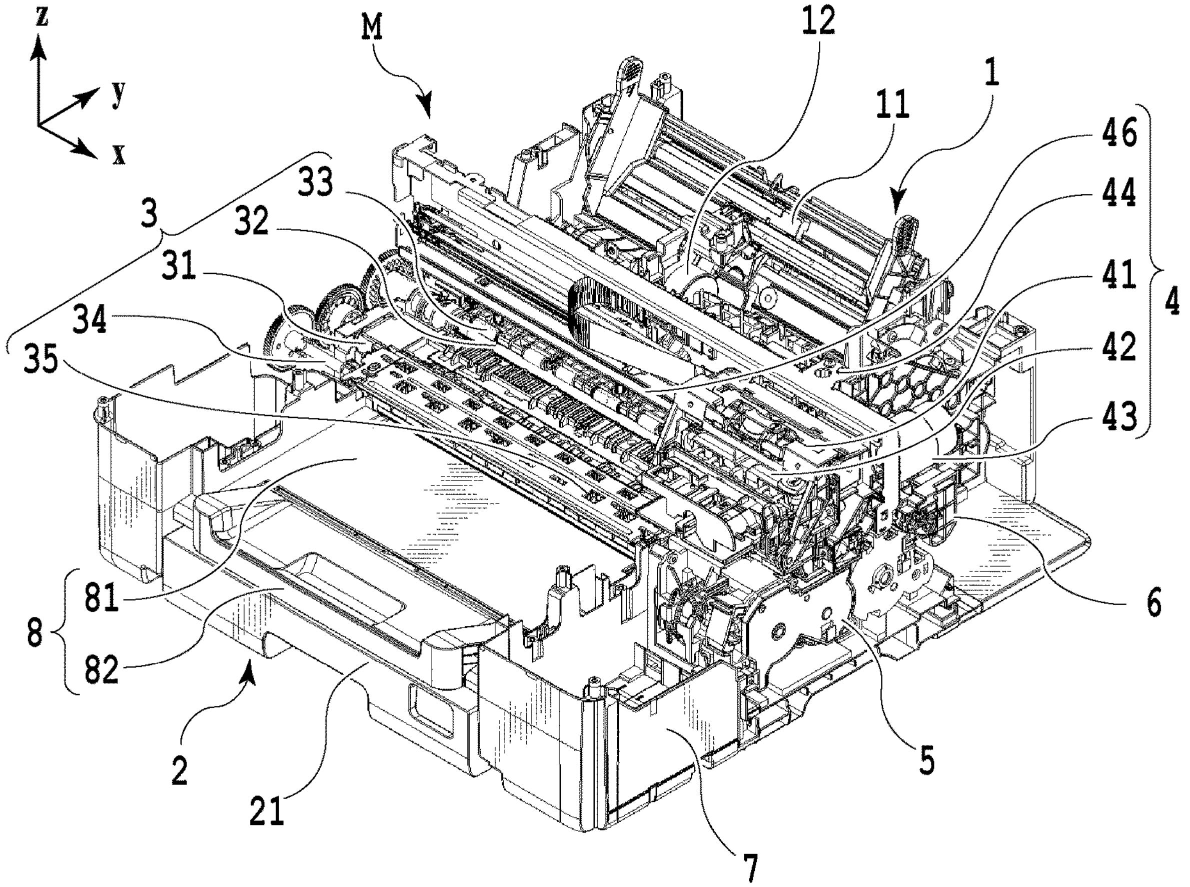
FIG. 1 is a perspective view of an image printing apparatus.

FIG. 1 is a perspective view illustrating a configuration of an image printing apparatus according to a first embodiment of the present disclosure except a cover and a case forming an outer casing. An image printing apparatus M is a multifunction apparatus including a printing mechanism and a scanner mechanism (not illustrated) arranged on the top of the printing mechanism and can execute processing relevant to a printing operation and a reading operation of an image by the printing mechanism and the scanner mechanism individually or in cooperation. The scanner mechanism includes an auto document feeder (ADF) and a flat bed scanner (FBS) and can read an original document automatically fed by the ADF and read (scan) the original document put on a platen glass of the FBS by a user. Note that, although the image printing apparatus of the present embodiment is a multifunction apparatus including both the printing mechanism and scanner mechanism, a mode without the scanner mechanism may be applicable.

Schematically, the printing mechanism includes a first feeding unit 1 and a second feeding unit 2 on each of which the user can stack the printing medium and a conveyance unit 3 that conveys the printing medium fed from the feeding units. Additionally, the printing mechanism includes a printing unit 4 that prints an image on the printing medium conveyed by the conveyance unit 3 and a discharging unit 8 on which the printing medium discharged after the image is printed is stacked. The discharging unit 8 includes a printing medium stacking unit 81 and an extension tray 82 that can be drawn from the apparatus M to support the printing medium in a case where the size of the printing medium is large. Moreover, the printing mechanism includes a maintenance unit 5 that performs maintenance to keep a good ejection state of a printing head in the printing unit 4 and a driving force transmission unit 6. As described later in detail with reference to FIG. 4A and the following drawings, the driving force transmission unit 6 uses force of rotation of a conveyance motor 31 in the conveyance unit 3 as driving force and performs switching to any one of the first feeding unit 1, the second feeding unit 2, and the maintenance unit 5 to transmit the driving force. All the above units are fixed on a base 7 to form the printing mechanism.

Figure 2:
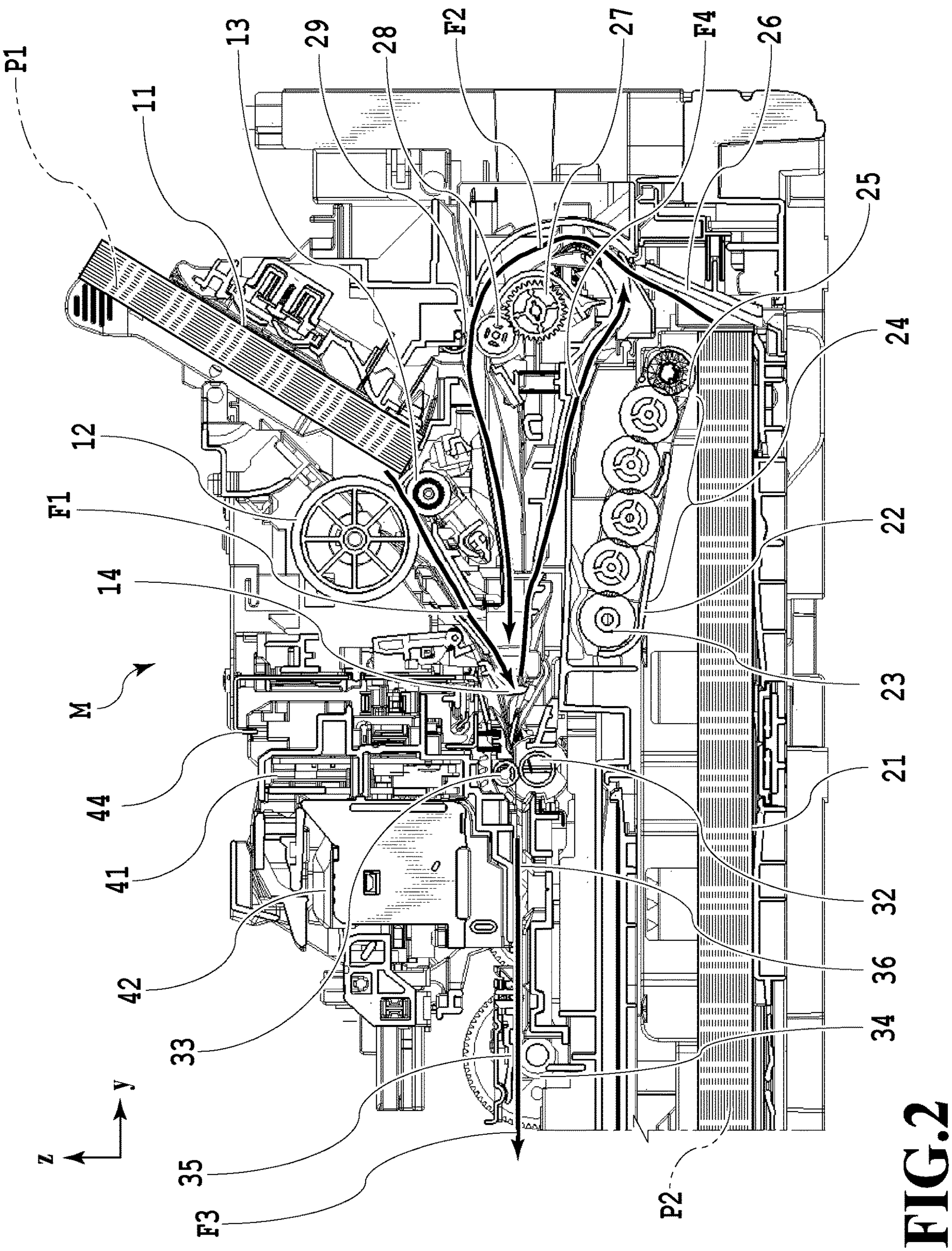
FIG. 2 is a cross-sectional view illustrating conveyance of a printing medium inside the image printing apparatus.

FIG. 2 is a cross-sectional view of the image printing apparatus illustrated in FIG. 1 and illustrates the conveyance of the printing medium on which an image is printed. In the present embodiment, there are two methods described below to set the printing medium by the user to print an image. The first one is to set the printing medium to the first feeding unit 1 by stacking a printing medium P1 on a pressing plate 11. The second one is to set a printing medium P2 to the second feeding unit 2 by stacking the printing medium P2 on a cassette case 21 that is attachable and detachable to and from the image printing apparatus M. Once an image printing instruction from the user is inputted through a not-illustrated operation unit or the like, the conveyance motor 31 makes a positive rotation to perform feeding. That is, in a case where the first feeding unit 1 performs the feeding, the driving force transmission unit 6 is connected to a driving mechanism of the first feeding unit 1 to transmit the driving force from the rotation of the conveyance motor 31. Thus, a first feeding roller 12 of the first feeding unit 1 is rotated to be put in contact with the pressing plate 11, and a sheet is fed. A separation roller 13 that provides a resistance in a feeding direction of the printing medium is arranged in a position facing the first feeding roller 12, and thus only the topmost paper of the printing mediums P1 stacked on the pressing plate 11 is fed to the conveyance unit as indicated by an arrow F1.

In a case where the second feeding unit 2 performs the feeding, the driving force transmission unit 6 is connected to a driving mechanism of the second feeding unit 2 to transmit the driving force of the conveyance motor 31. In detail, the driving force of the conveyance motor 31 is transmitted to a second feeding shaft gear 23 of the second feeding unit 2 through the driving force transmission unit 6. A second feeding roller 25 is then rotated by the second feeding shaft gear 23 through multiple second feeding idle gears 24, and only the topmost paper of the printing mediums P2 stacked on the cassette case 21 is fed. That is, a separation unit 26 that provides a resistance to the fed printing medium in the feeding direction is provided, and thus only the topmost paper being in contact with the second feeding roller 25 is fed by the separation unit 26 even in a case where multiple printing mediums are fed. Additionally, the drive is transmitted to an intermediate gear 27 and an intermediate roller 28 through a not-illustrated gear driving row of the driving force transmission unit 6. Thus, the printing medium fed from the second feeding roller 25 is fed to the conveyance unit 3 as indicated by an arrow F2 by cooperation with a driven roller 29 arranged in a position facing the intermediate roller 28. Once the printing medium fed from each feeding unit described above passes through a detection lever 14, positions of right and left tip portions in a width direction of the printing medium are aligned with respect to a conveyance direction of the printing medium by a pair of conveyance rollers, which are a conveyance roller 32 and a pinch roller 33 driven by the conveyance roller 32. Note that, the conveyance direction of the printing medium in the printing unit (a y direction) is a direction orthogonal to the scanning direction of the printing head (an x direction).

The printing unit 4 includes a printing head 42, a carriage 41 on which the printing head 42 is mounted, a chassis 44 that movably supports the carriage 41, and a chassis rail 46 as a sliding member. The carriage 41 can reciprocally move in the scanning direction crossing the conveyance direction of the fed printing medium. Along with the passing of the printing medium conveyed by the pair of conveyance rollers and the like over a platen 36 provided in the position facing the present printing unit to bias the printing medium, ink is ejected from the printing head 42 during the scanning of the printing head 42 by the moving carriage 41, and an image is printed on the printing medium.

In a case where an image is printed on only one side of the printing medium, as indicated by an arrow F3 in FIG. 2, the printing medium is discharged to the discharging unit 8 through a pair of discharging rollers, which are a discharging roller 34 and a spur 35. In a case where an image is printed on two sides of the printing medium, after the printing of an image on one side of the printing medium is completed, the conveyance motor 31 is inversely rotated from a state in which a rear end of the printing medium is pinched. The pair of discharging rollers and the pair of conveyance rollers are then rotated inversely from the conveyance direction in which an image is printed, and as indicated by an arrow F4 in FIG. 2, the printing medium is conveyed in an inverse conveyance route. Then, once the rear end of the printing medium in the conveyance direction passes through the pair of conveyance rollers, the conveyance motor 31 is switched into the positive rotation, and the positions of the right and left tip portions in the width direction of the printing medium are aligned again by the pair of conveyance rollers. Thereafter, an operation similar to the described printing of an image on one side of the printing medium is performed, and the printing medium on which an image is printed is discharged to the discharging unit 8 through the pair of discharging rollers, which are the discharging roller 34 and the spur 35 as indicated by the arrow F3 in FIG. 2. Additionally, the maintenance unit 5 is arranged outside a range of main scanning for the printing of an image on the printing medium, and in a case where no image is printed or the like, the carriage 41 is positioned in a waiting position on the maintenance unit 5 and performs a recovery operation of the printing head 42 and the like.

Figure 3:
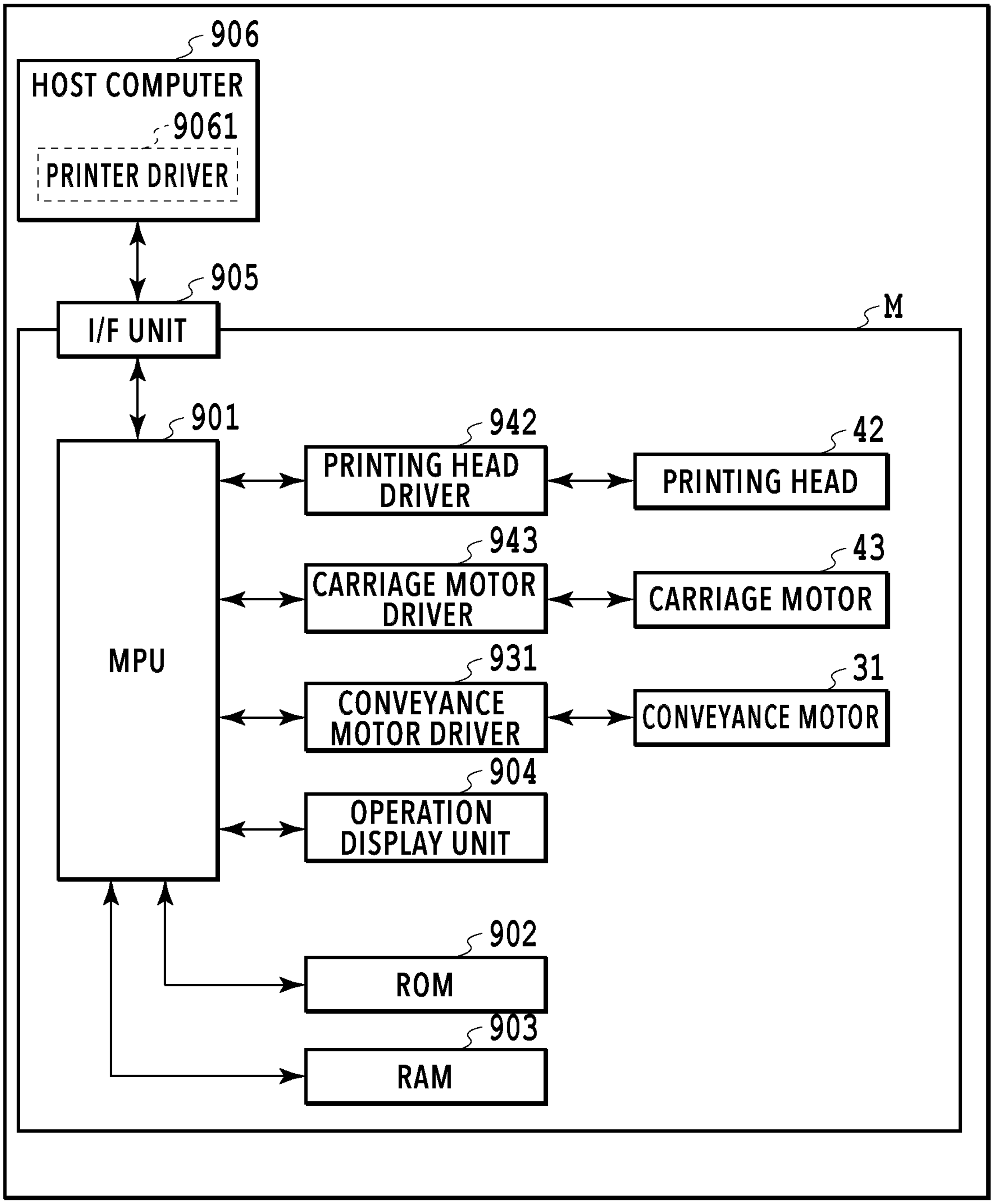
FIG. 3 is a block diagram of the image printing apparatus.

FIG. 3 is a block diagram illustrating a functional configuration relevant to control of the image printing apparatus of the present embodiment illustrated in FIGS. 1 and 2. According to a processing procedure by a printer driver 9061 of a host computer 906, the image printing apparatus M of the present embodiment executes the printing operation and the like according to image data and a control signal received from the host computer 906 through an OF unit 905.

In the image printing apparatus M, an MPU 901 controls an operation of each unit in the apparatus, processing of data, and the like. A ROM 902 stores a program and data to be executed by the MPU 901. A RAM 903 temporarily stores processing data to be executed by the MPU 901 and data received from the host computer 906. A printing head driver 942 controls an ink ejection operation by the printing head 42 according to control by the MPU 901. A carriage motor driver 943 controls driving of a carriage motor 43 according to the control by the MPU 901 and moves the carriage 41. A conveyance motor driver 931 controls rotational driving of the conveyance motor 31 according to the control by the MPU 901 and rotates each of the conveyance roller 32 and the discharging roller 34. The MPU 901 displays a state of the image printing apparatus M and the like on an operation display unit 904.

Figure 4A:
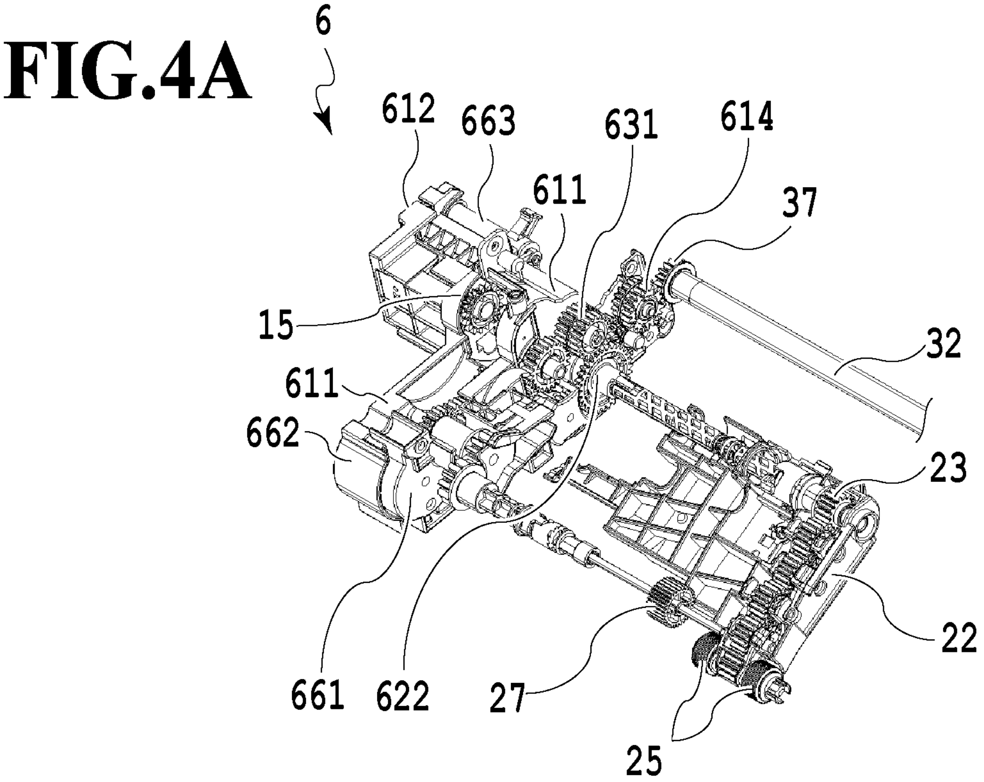
FIGS. 4A and 4B are perspective views of a driving force transmission unit.
Figure 4B:
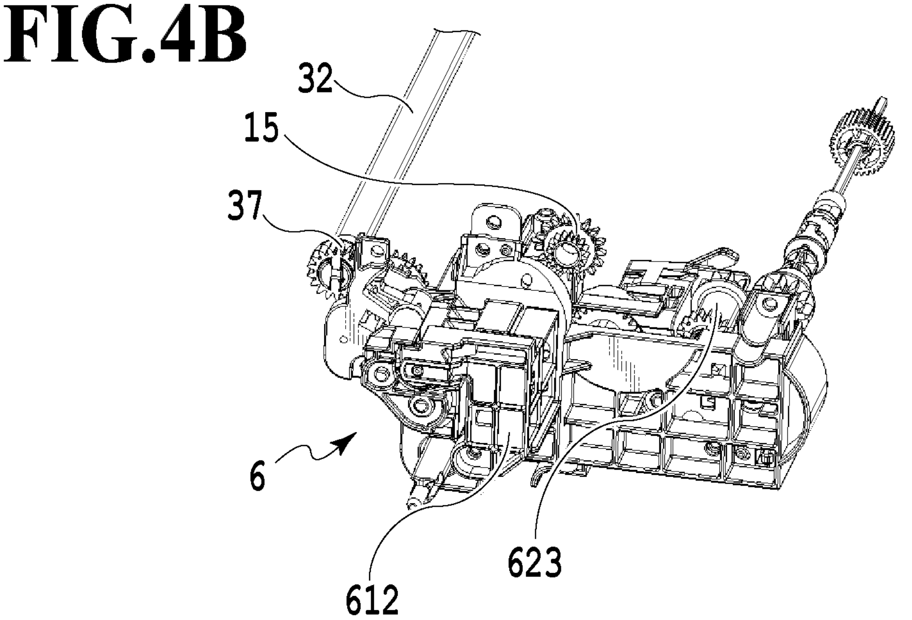
Figure 5A:
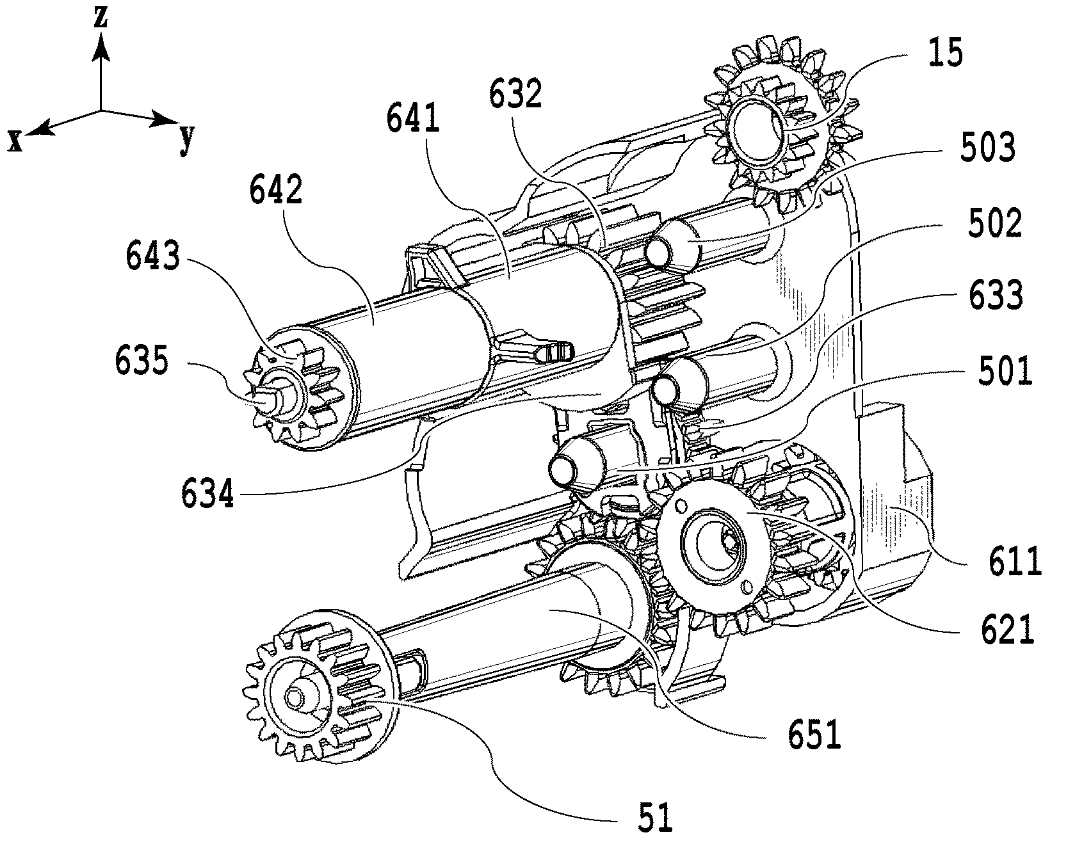
FIGS. 5A and 5B are perspective views of a driving force transmission switching mechanism.
Figure 5B:
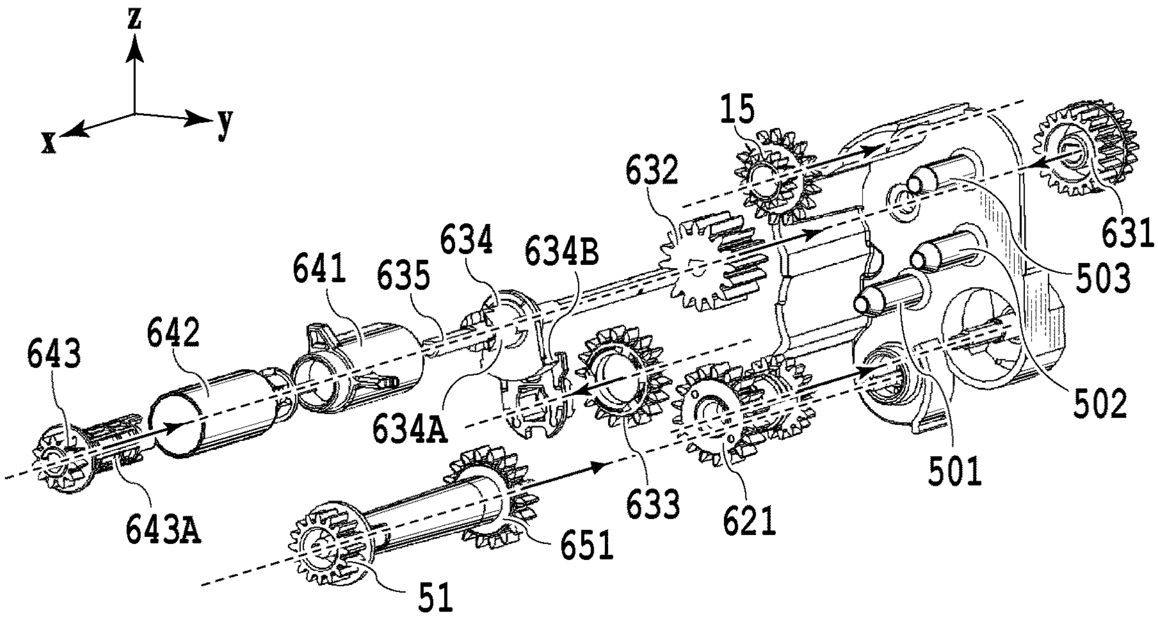

FIGS. 4A and 4B are diagrams describing a configuration relevant to the driving force transmission by the driving force transmission unit based on the driving force of the conveyance roller in the image printing apparatus according to an embodiment of the present disclosure. FIG. 4A is a perspective view of the configuration viewed from the side of a scanning range the printing head 42, and FIG. 4B is a perspective view of the configuration viewed from the side of an end portion outside the scanning range. Additionally, FIGS. 5A and 5B are perspective views illustrating a driving force transmission switching mechanism formed in the driving force transmission unit 6. FIG. 5A illustrates the driving force transmission switching mechanism after assembling, and FIG. 5B illustrates the driving force transmission switching mechanism before assembling.

The driving force of the conveyance motor 31 (not illustrated in FIGS. 4A, 4B, 5A, and 5B) as a driving source rotates the conveyance roller 32. Additionally, as illustrated in FIGS. 4A and 4B, the rotational driving force of the conveyance roller 32 is transmitted to the driving force transmission unit 6 through a conveyance roller output gear 37 that rotates integrally with the conveyance roller 32. Corresponding to this, the driving force transmission unit 6 includes a drive input gear 614 engaged with the conveyance roller output gear 37 and a sun gear A 631 to which the rotation of the drive input gear 614 is transmitted through multiple gears. Additionally, the driving force transmission unit 6 includes a positioning unit 663 described later in detail.

The driving force transmission unit 6 illustrated in FIGS. 5A and 5B is illustrated except a drive cover 612 out of a drive base 611 and the drive cover 612 forming an outer case thereof. The sun gear A 631 and a sun gear B 632 arranged inside the drive base 611 are each fitted to a driving shaft 635 (hereinafter, also referred to as a pivoting shaft) in a D-cut shape and are thus rotated integrally with the driving shaft 635. The driving shaft 635 is rotatably supported by the drive base 611 and the drive cover 612 so as to be pivotable. The driving shaft 635 is arranged in parallel to the movement direction of the carriage 41 (so-called a main scanning direction) and expands or extends in the movement direction. A planetary arm 634 that rotatably holds a planetary gear 633 is supported by the driving shaft 635 so as to be movable along the driving shaft 635. Additionally, the planetary arm 634 includes a projecting portion 634A, and comb teeth are formed inside the projecting portion. On the other hand, a driving shaft gear 643 at an end portion of the driving shaft 635 includes a projecting portion 643A, and comb teeth are formed on an outer surface thereof. With the above-described comb teeth configurations, the comb teeth of the projecting portion 634A and the comb teeth of the projecting portion 643A are engaged with each other in a predetermined position in accordance with the movement of the planetary arm 634, and the planetary arm 634 can pivot along with the rotation of the driving shaft 635. With the above-described configurations of the planetary arm 634 and the planetary gear 633, the planetary gear 633 is engaged with the sun gear B 632 and can function as a planetary gear mechanism.

Moreover, a trigger holder (also referred to as a movement unit) 641 and a trigger holder spring 642 are supported by the driving shaft 635 so as to be movable along the driving shaft. Thus, as described later, the trigger holder spring 642 applies biasing force to the movement of the trigger holder 641 and the planetary arm 634 along the driving shaft 635 caused by the movement of the carriage 41. Furthermore, the driving shaft gear 643 is supported so as to be rotatable integrally with the driving shaft 635 at an end portion of the driving shaft 635 on the side opposite to an end portion at which the sun gear A 631 and the sun gear B 632 are supported. The sun gear B 632, the planetary gear 633, the planetary arm 634, and the trigger holder 641 described above act mutually in a driving force transmission switching operation described later with reference to FIG. 7 and the following drawings, and in this regard, a driving force transmission switching unit is formed. In the driving force transmission switching unit, the trigger holder spring 642 constantly biases the trigger holder 641 in a −x direction in FIG. 5.

Additionally, with reference to FIGS. 5A and 5B, the drive base 611 is provided with a supporting shaft 501, a supporting shaft 502, and a supporting shaft 503 projecting respectively toward the inside of the driving force transmission unit 6. Those supporting shafts 501, 502, and 503 correspond to the driving of the maintenance unit 5, the second feeding unit 2, and the first feeding unit 1, respectively. Moreover, an inner diameter portion of a fitting shaft 634B of the planetary arm 634 is engaged with the shafts. This makes it possible to transmit the driving force to each unit (to switch a transmission destination of the driving force). In detail, the planetary arm 634 holding the planetary gear 633 can pivot about the driving shaft 635, and the supporting shafts 501, 502, and 503 are each arranged on a pivot trajectory of the planetary gear 633 (a direction crossing the driving shaft 635) in this pivoting. Furthermore, a shaft hole for inserting the same shafts is formed in the fitting shaft 634B of the planetary arm 634, and the shaft hole in the fitting shaft 634B of the planetary arm 634 pivots to a position facing each supporting shaft to allow for the insertion of the supporting shaft. Then, once the supporting shaft 501 is inserted through the shaft hole in the fitting shaft 634B of the planetary arm 634, the planetary gear 633 is engaged with a maintenance input gear 651. Likewise, once the supporting shaft 502 is inserted through the shaft hole in the fitting shaft 634B of the planetary arm 634, engagement with a second feeding input gear 621 is made and the drive can be transmitted, and once the supporting shaft 503 is inserted therethrough, engagement with a first feeding input gear 15 is made and the drive can be transmitted. In this regard, the planetary gear 633 functions as a transmission gear that transmits the driving force. Note that, FIG. 5A illustrates a state in which the planetary gear 633 is engaged with the maintenance input gear 651 (the driving force transmission to the maintenance unit). Hereinafter, the supporting shafts 501, 502, and 503 are also referred as a first switching position, a second switching position, and a third switching position, respectively.

An operation of the driving force transmission unit 6 with the above-described configuration is as described below. As described with reference to FIGS. 4A and 4B, the rotation of the conveyance roller 32 (see FIGS. 4A and 4B) causes the rotation of the driving shaft 635 through the sun gear A 631 and the like. The rotation of the driving shaft 635 causes the rotation of the sun gear B 632, and the planetary gear 633 engaged with the sun gear B 632 rotates accordingly. This rotation causes the rotation of the maintenance input gear 651, the second feeding input gear 621, or the first feeding input gear 15 corresponding to each supporting shaft, and this makes it possible to transmit the driving force to the corresponding driving unit. Additionally, in the driving force transmission switching operation (an operation to change the supporting shaft), the planetary arm 634 is rotated together with the above-described rotation of the driving shaft 635, and the shaft hole in the fitting shaft 634B of the planetary arm 634 is aligned with the corresponding supporting shaft. In accordance with the alignment, it is possible to insert the aligned supporting shaft through the shaft hole in the fitting shaft 634B of the planetary arm 634 by the trigger holder 641 biased by the trigger holder spring 642.

Figure 6:
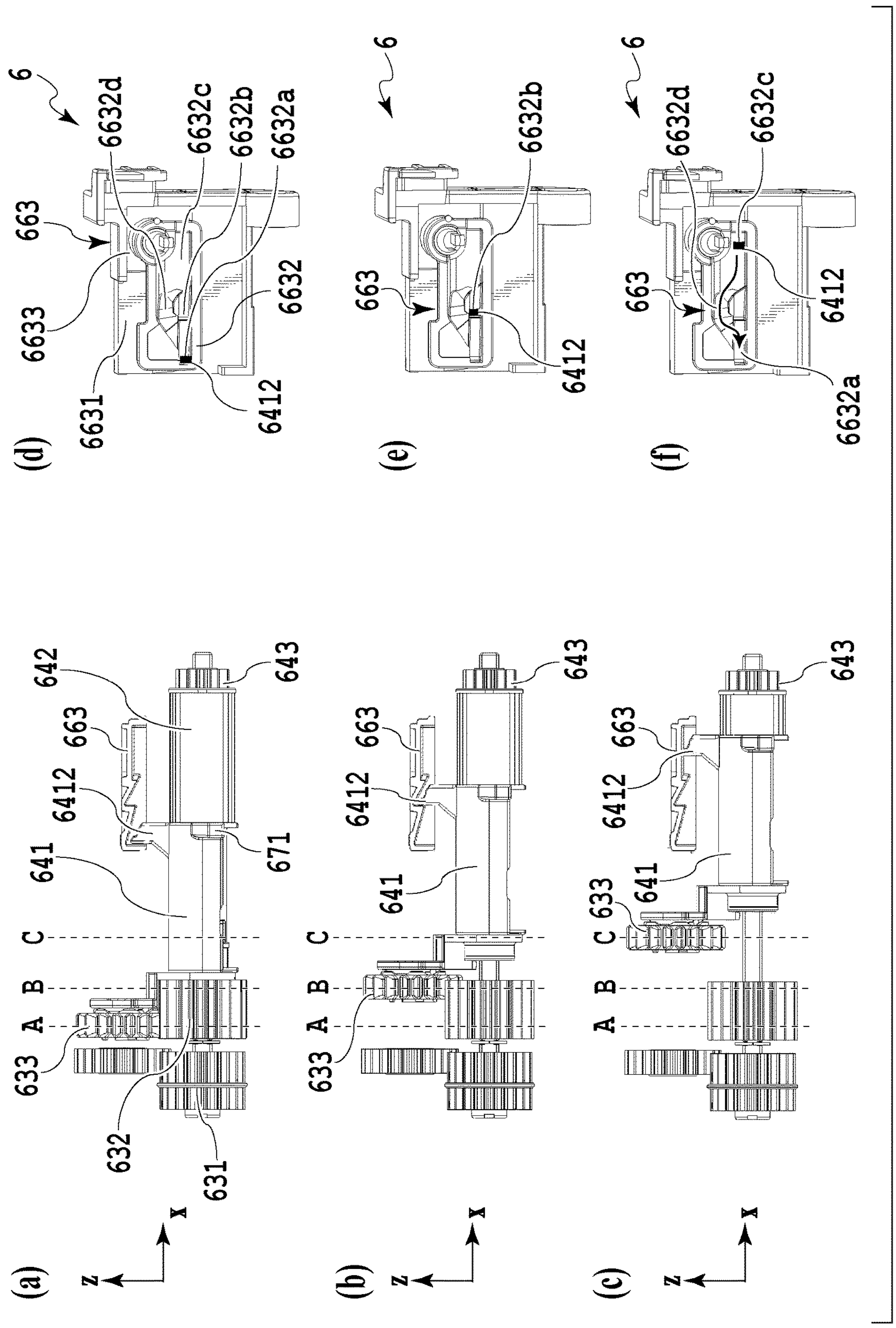
FIG. 6 is a diagram illustrating a lock position in which a driving force transmission switching unit is held.

Reference signs (a), (b), and (c) of FIG. 6 are side views describing three positions of engagement or non-engagement of the planetary gear along with the movement of the driving force transmission switching unit in the present embodiment. Additionally, reference signs (d), (e), and (f) of FIG. 6 are diagrams particularly illustrating a positioning unit 663 provided in the driving force transmission unit 6. Holding positions illustrated in (d), (e), and (f) of FIG. 6 correspond to positions illustrated in (a), (b), and (c) of FIG. 6, respectively. The positioning unit 663 is in the form of a clutch 6632 and is engaged with a lock member 6412 provided to the trigger holder 641 forming the driving force transmission switching unit. The lock member 6412 can be positioned inside a recess portion in the clutch 6632 and can be moved along an inclined surface along with the movement of the trigger holder 641. Additionally, the positioning unit 663 includes a clutch spring 6633 held by a clutch holder 6631, and the clutch spring 6633 biases the clutch 6632 and the lock member 6412 of the trigger holder 641 to prevent the engagement therebetween from being released.

As illustrated in (a) and (d) of FIG. 6, in a case where the lock member 6412 is locked with a first lock portion 6632*a* provided to the clutch 6632, the driving force transmission switching unit is held in a first lock position (A: a first position). Note that, in the locking at the first lock portion 6632*a*, as illustrated in (a) of FIG. 6, the lock member 6412 is pressed onto a tooth-side portion in a sawtooth form by the biasing force of the trigger holder spring 642. Thus, the position of the driving force transmission switching unit is held. The same applies to the holding of the position illustrated in (b) and (e) of FIG. 6 described below.

In the position illustrated in (a) and (d) of FIG. 6, any one of the supporting shafts 1 to 3 is inserted through the shaft hole in the fitting shaft 634B of the planetary arm 634, and it is possible to transmit the driving force or to disconnect the driving force transmission to the driving unit corresponding to the inserted supporting shaft. In the present embodiment, in the positions, it is possible to perform the maintenance of the printing head by driving the maintenance unit 5, or it is possible to stop the feeding of the printing medium by the first feeding unit 1 or the second feeding unit 2.

As illustrated in (b) and (e) of FIG. 6, the driving force transmission switching unit is moved in the axial direction by a predetermined amount along with the movement of the carriage 41, and the lock member 6412 is locked with a second lock portion 6632*b* of the clutch 6632. Thus, the driving force transmission switching unit is held in a second lock position (B: a second position). In this position, any one of the supporting shafts 1 to 3 is inserted through the shaft hole in the fitting shaft 634B of the planetary arm 634, and it is possible to transmit the driving force to the driving unit corresponding to the inserted supporting shaft. In the present embodiment, in this position, it is possible to perform the feeding by the first feeding unit 1 or the second feeding unit 2.

As illustrated in (c) and (f) of FIG. 6, once the lock member 6412 reaches a drive switching position 6632*c* of the clutch 6632, the shaft hole in the fitting shaft 634B of the planetary arm 634 is brought to a position in which the shaft hole is disengaged from any of the supporting shafts 1 to 3. In this position, the planetary arm 634 is pivotable, and it is possible to perform the driving force transmission switching operation to move to another supporting shaft.

Once the carriage 41 moves in the direction opposite to the above-described pushing movement, the driving force transmission switching unit is moved in the −x direction by the biasing force of the trigger holder spring 642. Along with the movement, the lock member 6412 passes over a protrusion portion 6632*d* formed of multiple curved surfaces by way of an inclined surface adjacent to the drive switching position 6632*c*, and the lock member 6412 returns to the first lock portion 6632*a* (the first lock position).

Figure 7:
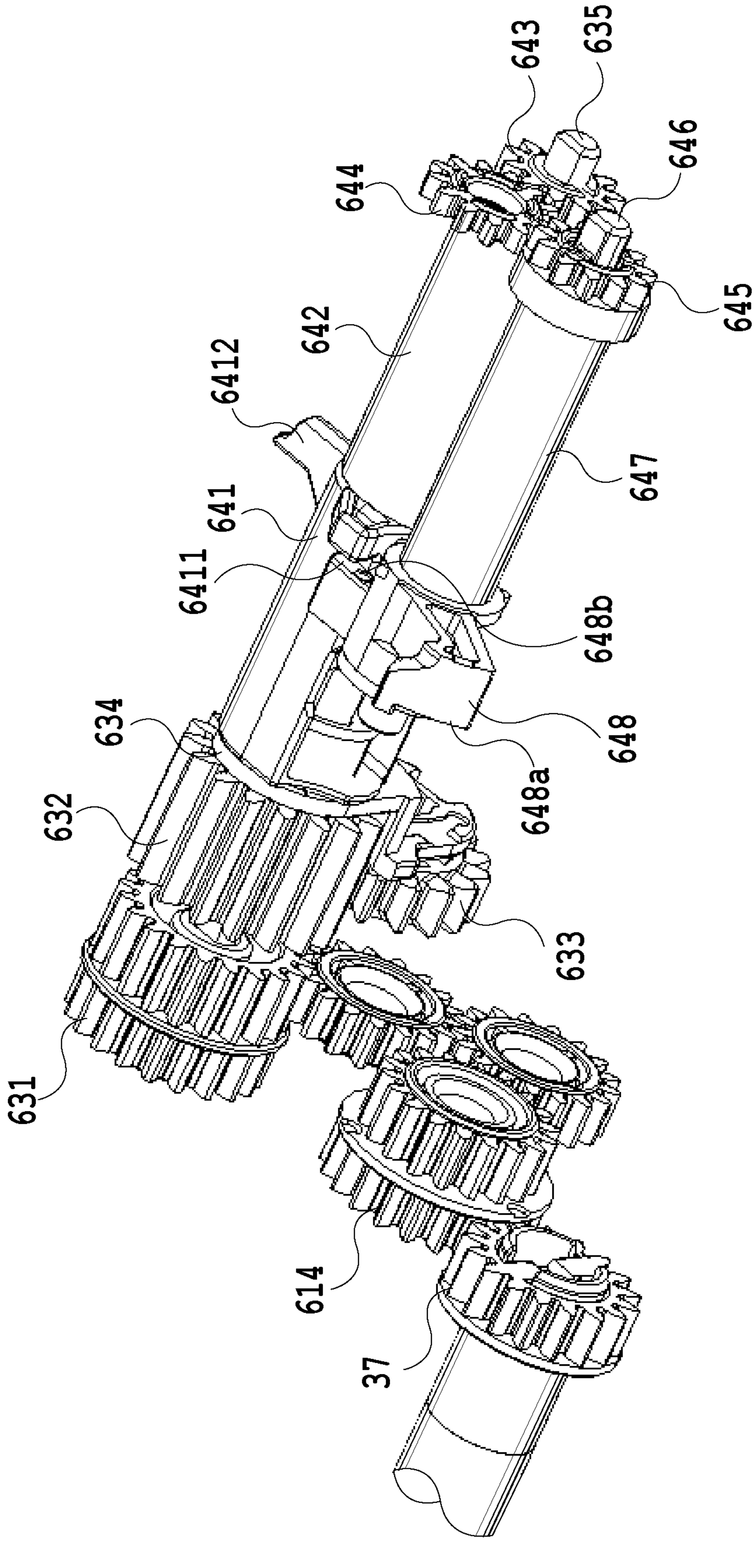
FIG. 7 is a perspective view illustrating a contact mechanism.
Figure 8A:
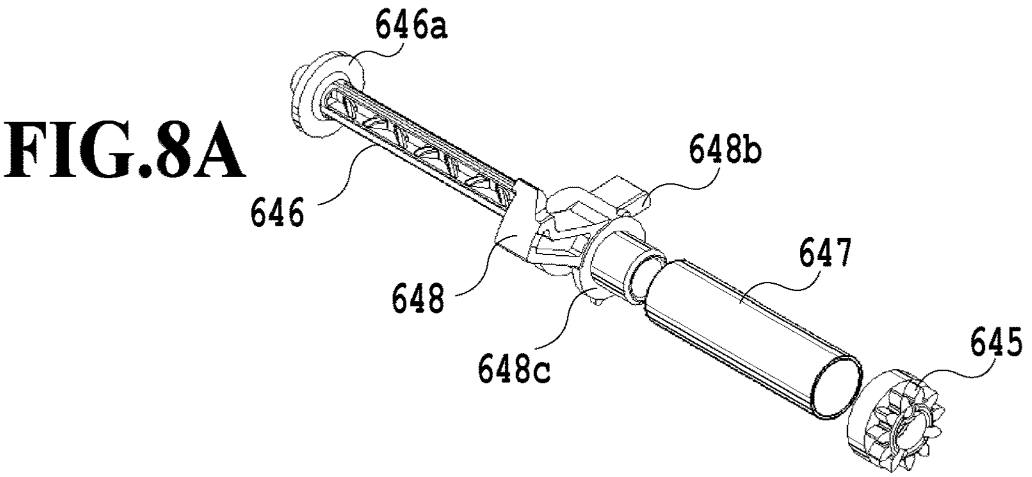
FIGS. 8A to 8D are perspective views illustrating a structure around a contact unit in the contact mechanism.
Figure 8B:
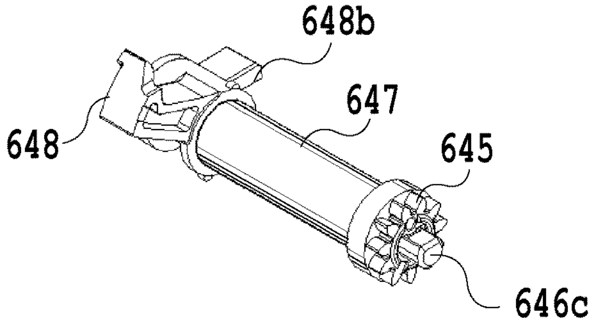
Figure 8C:
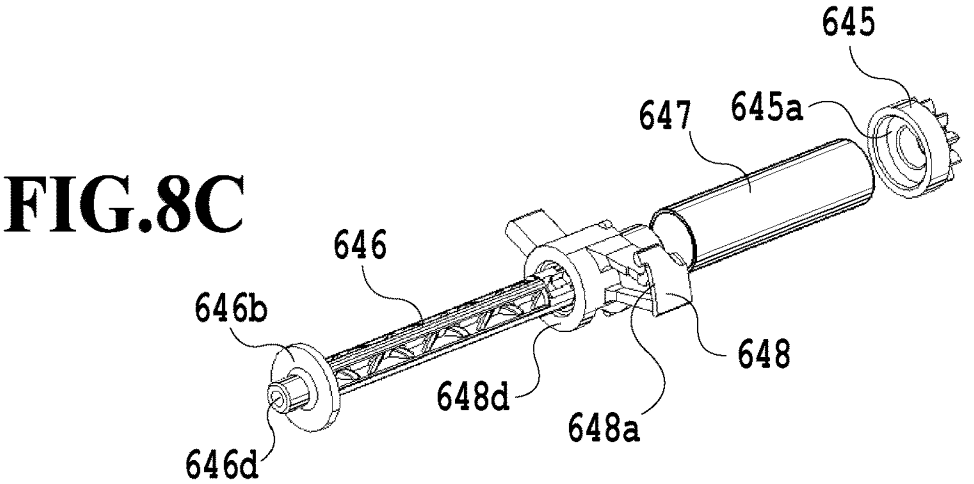
Figure 8D:
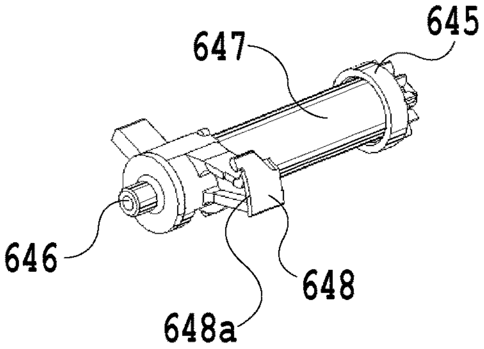

The switching of the driving force transmission destination (referred to as drive switching) along with the contact of the carriage is described below. FIG. 7 is a diagram describing a contact mechanism for the contact with the carriage 41 in the switching operation by the above-described driving force transmission unit 6 and illustrates a perspective view of the contact mechanism. The carriage 41 is put in contact with a contact unit 648 of the contact mechanism along with the movement (pushing toward a home position), and thus a position of the planetary arm 634 (accordingly, the planetary gear 633) of the driving force transmission unit 6 along the driving shaft 635 is determined. FIGS. 8A to 8D are perspective views illustrating a structure around the contact unit 648. In detail, FIGS. 8A and 8C are perspective views from different directions before assembling, respectively, and FIGS. 8B and 8D are perspective views from different directions after assembling, respectively.

The driving force of the conveyance motor 31 is transmitted to the driving shaft gear 643. Then, the force is transmitted to a rotatably supporting unit gear 645 by the driving of the driving shaft gear 643 through a driving shaft idle gear 644 rotatably supported by a shaft provided to a not-illustrated driving gear cover 662.

The rotatably supporting unit gear 645 and a rotatably supporting unit 646 are fitted to each other in a D-cut shape and rotate integrally. A shaft 646*c* of the rotatably supporting unit 646 is rotatably supported by the not-illustrated driving gear cover 662, while a shaft 646*d* on the opposite side is rotatably supported by a not-illustrated driving gear base 661. Thus, the rotatably supporting unit 646 is arranged in parallel to the scanning direction of the carriage 41. Additionally, a biasing unit 647 and the contact unit 648 are rotatably supported by the rotatably supporting unit 646. Note that, in the present embodiment, a spring is used as the biasing unit 647.

The rotatably supporting unit 646 and the drive switching contact unit 648 are biased toward the not-illustrated driving gear base 661 by the biasing force of the biasing unit 647, and the rotatably supporting unit gear 645 is biased toward the driving gear cover 662. The contact unit 648 is driven to rotate in the same direction as that of the rotatably supporting unit 646 by friction force generated between a surface 646*a* of the rotatably supporting unit 646 driven to rotate and a surface 648*d* of the contact unit 648 with the biasing unit 647 biasing a surface 648*c* of the contact unit 648.

In the contact unit 648, there are provided a first contact surface 648*a* that is put in contact with the carriage 41 and a second contact surface 648*b* that is put in contact with a contacted surface 6411 of the trigger holder 641 with the carriage 41 further moving in the axial direction (+X direction) to push in the contact unit 648. With such a configuration, the driving force transmission switching unit is moved to the first lock position, the second lock position, the drive switching position, and the like as illustrated in FIG. 6 in accordance with the movement amount (pushing amount) of the carriage 41. In order to keep the pushing of the first contact surface 648*a* by the carriage 41 while the carriage 41 and the first contact surface 648*a* are in contact with each other, a hook shape like a protrusion may be provided. In a case where the carriage 41 does not push the contact unit 648, the contact unit 648 is not in contact with the driving force transmission switching unit; therefore, constant biasing force is constantly applied to the driving force transmission switching unit by the biasing unit 647. Accordingly, it is unnecessary to change the driving amount to rotate the contact unit 648 depending on the position of the driving force transmission switching unit.

It is possible to increase the driving force of the contact unit 648 by increasing the biasing force from the biasing unit 647. This makes it possible to reduce a delay of the driving caused by stick-slip on the contact surface between the biasing unit 647 and the drive switching contact unit 648. Additionally, it is desirable to arrange the biasing unit 647 such that the rotatably supporting unit gear 645 and the contact unit 648 are rotated concurrently. In this regard, in the configuration illustrated in FIGS. 7 and 8A to 8D according to the present embodiment, the biasing unit 647 and the contact unit 648 are started to rotate integrally in a case where the driving force is transmitted. Therefore, as the driving force to drive the contact unit 648, driving force based on a static friction coefficient and the biasing force between two parts (that is, the biasing unit 647 and the contact unit 648) is generated. In general, a static friction coefficient is greater than a kinetic friction coefficient. For this reason, it is possible to increase the driving force of the contact unit 648 without increasing the biasing force from the biasing unit 647 by employing the configuration illustrated in FIG. 7. The rotatably supporting unit gear 645 is provided with a standing wall 645*a*. The standing wall 645*a* plays a role to prevent positional deviation of the biasing unit 647 and also to suppress a loss in the biasing force even in the drive switching position with the greatest compression.

Figure 9A:
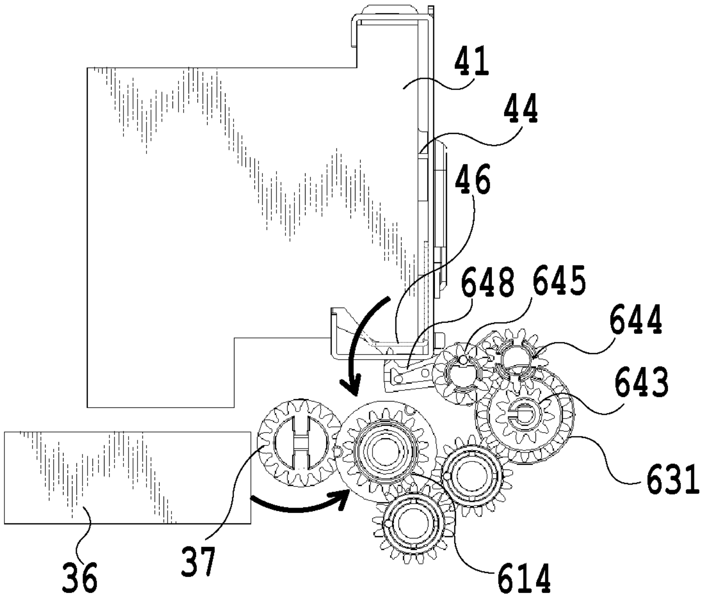
FIGS. 9A to 9C are cross-sectional views illustrating a relationship between a driving direction of a conveyance roller and a position of the contact unit.
Figure 9B:
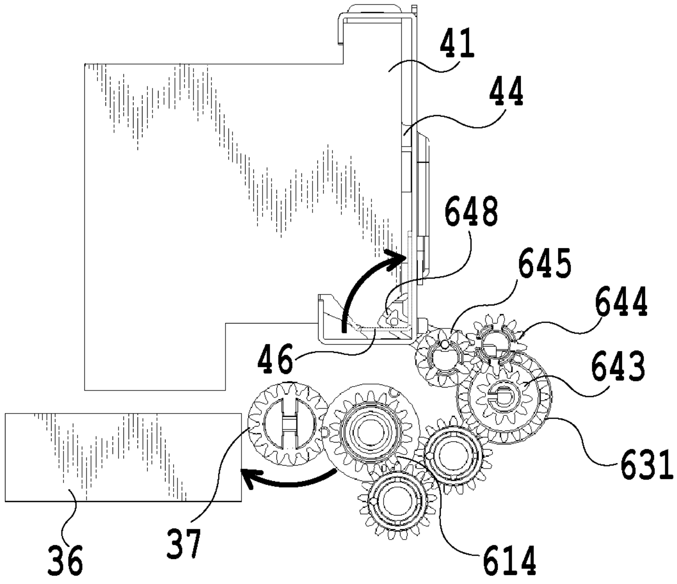
Figure 9C:
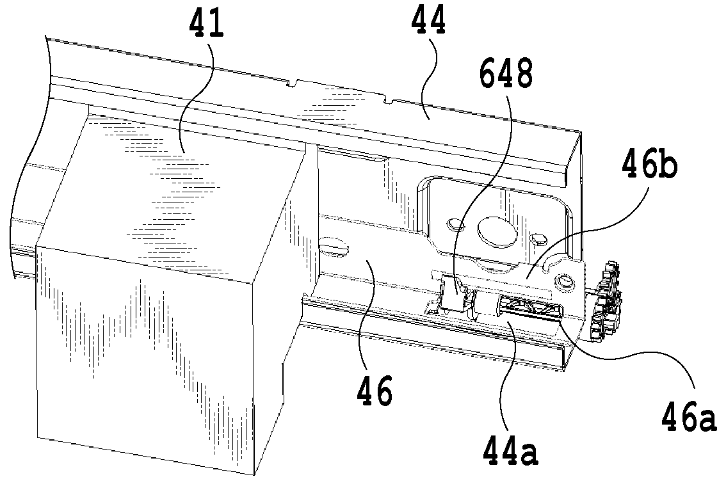

FIGS. 9A and 9B are simple diagrams illustrating the driving direction of the conveyance roller 32 and the position of the contact unit 648. FIG. 9C is a perspective view around the contact unit 648 and is a perspective view including the chassis 44 and the chassis rail 46.

FIG. 9A illustrates a state in which an image is printed on the printing medium fed from the first feeding unit 1 or the second feeding unit 2, that is, a state in which the conveyance roller 32 is rotated in a predetermined driving direction (referred to as a forward direction) in a case where the printing medium is sent from the feeding unit toward the printing unit. If the conveyance roller 32 is rotated counterclockwise, the contact unit 648 is also rotated counterclockwise. It is possible to arrange the contact unit 648 near a belt with which the carriage 41 scans by providing a notched portion 44*a* to the chassis 44 and by providing a notched portion 46*a* to the chassis rail 46. A not-illustrated restriction member restricts (holds) the movement of the contact unit 648 in a state of being completely withdrawn from the carriage 41, that is, in a position uncontactable with the carriage 41. A height of the uncontactable position is equal to or smaller than a height of the notched portion 44*a* and is desirably equal to or smaller than a height of the notched portion 46*a*.

Thus, the contact unit 648 and the carriage 41 never collide with each other even in the scanning of the carriage 41 to print an image on the printing medium. Therefore, it is possible to arrange the contact unit 648 within a range of a scanning region of the carriage 41. Additionally, since the biasing unit 647 drives the contact unit 648 with friction, the conveyance motor 31 is never locked even in a state in which the contact unit 648 is on the not-illustrated contacted surface.

FIG. 9B illustrates a state in which the driving direction of the conveyance roller 32 is opposite to that in FIG. 9A, that is, a state in which the conveyance roller 32 is rotated in a predetermined driving direction (referred to as a reverse direction because it is the direction opposite to the above-described forward direction) in a case where the printing medium is sent from the printing unit toward the feeding unit. If the conveyance roller 32 is rotated clockwise, the contact unit 648 is also rotated clockwise. The contact unit 648 is held in a position contactable with the carriage 41 by being put in contact with a contact surface 46*b* of the chassis rail 46. It is possible to move the driving force transmission switching unit by moving the contact unit 648 along the axial direction by the carriage 41 in this state. In the present embodiment, a configuration in which the contact unit 648 is put in contact with the carriage 41 is applied; therefore, a configuration that is unlikely to be affected by an accuracy of a part, that is, a configuration in which the contact unit 648 is put in contact with the chassis rail 46 on which the carriage 41 is slid is employed. However, a configuration in which the contact unit 648 is put in contact with the chassis 44 or another part may be employed. Additionally, in order to suppress an effect of the positional displacement (rolling and the like) of the carriage 41 caused by a resistance in the biasing unit 647 in a case where the contact unit 648 is moved by the carriage 41, it is desirable to provide a contact position near the belt with which the carriage 41 scans.

Effect of Present Embodiment

Figure 10A:
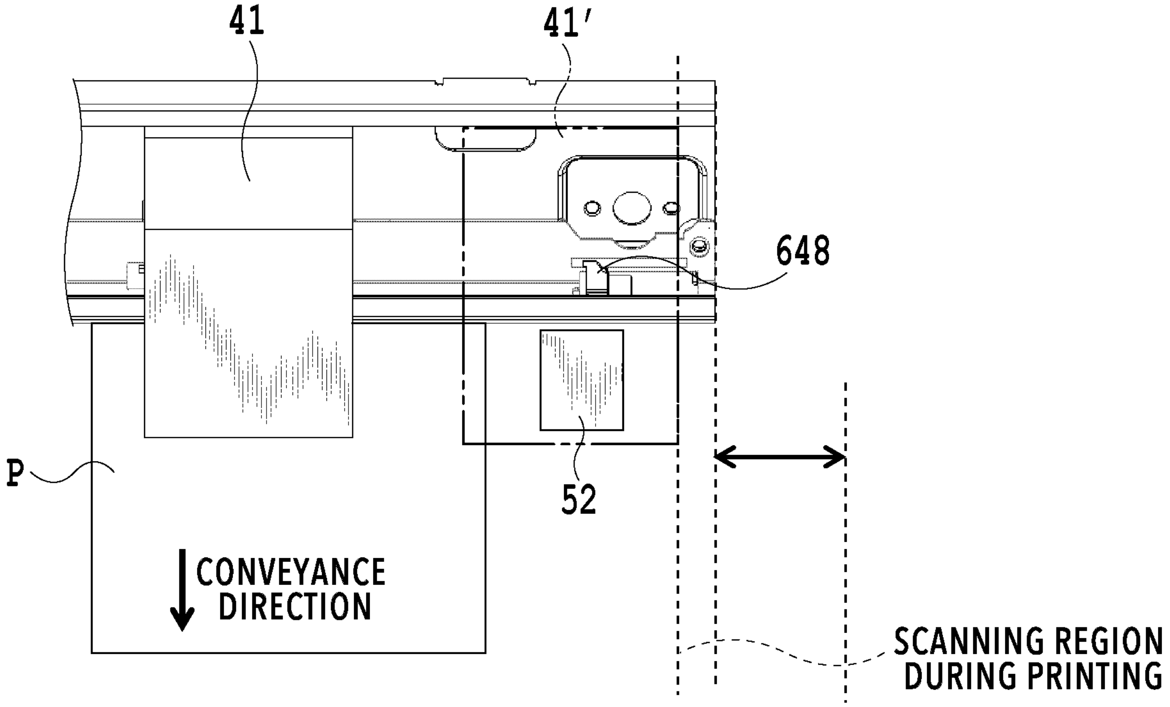
FIGS. 10A and 10B are diagrams describing an effect of the present disclosure.
Figure 10B:
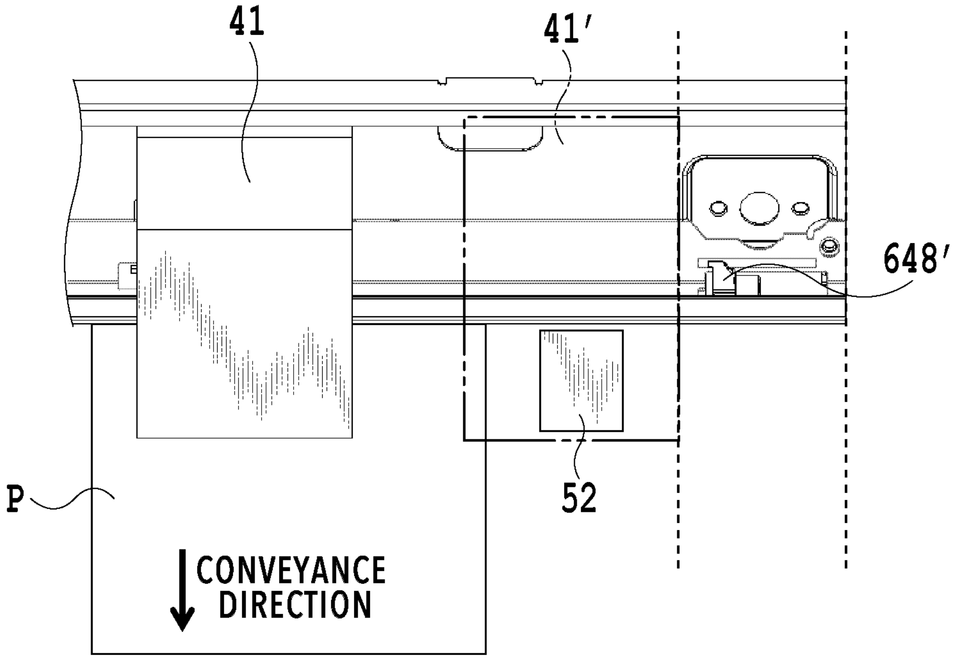
Figure 11A:
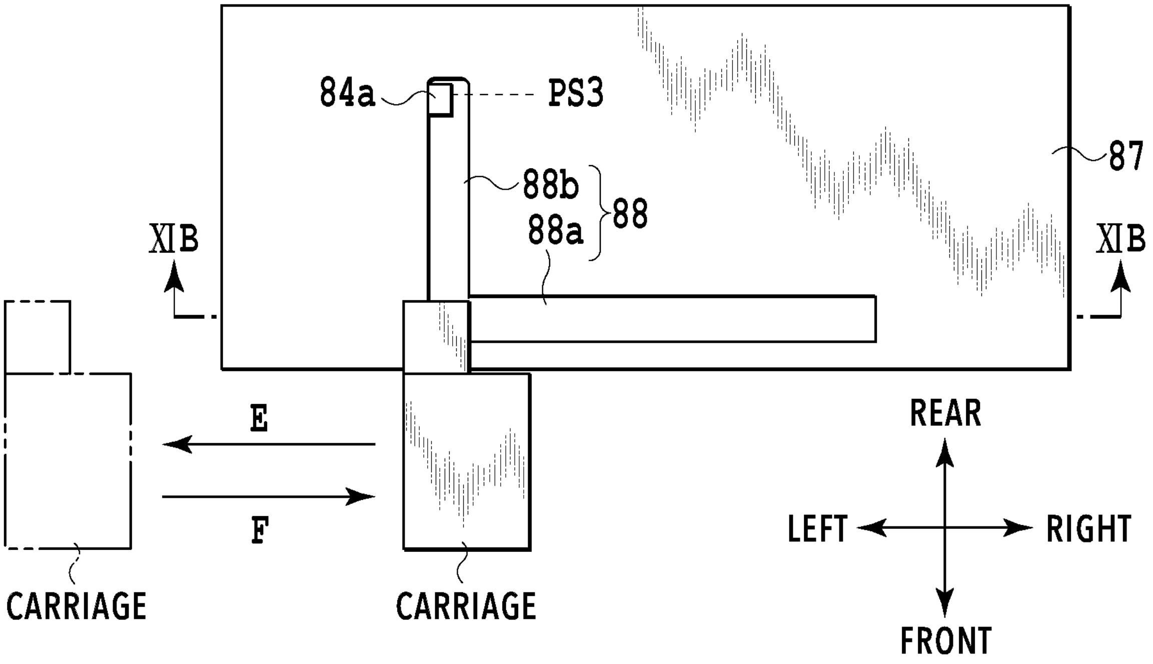
FIGS. 11A and 11B are schematic views illustrating a drive switching mechanism in a conventional image printing apparatus.
Figure 11B:
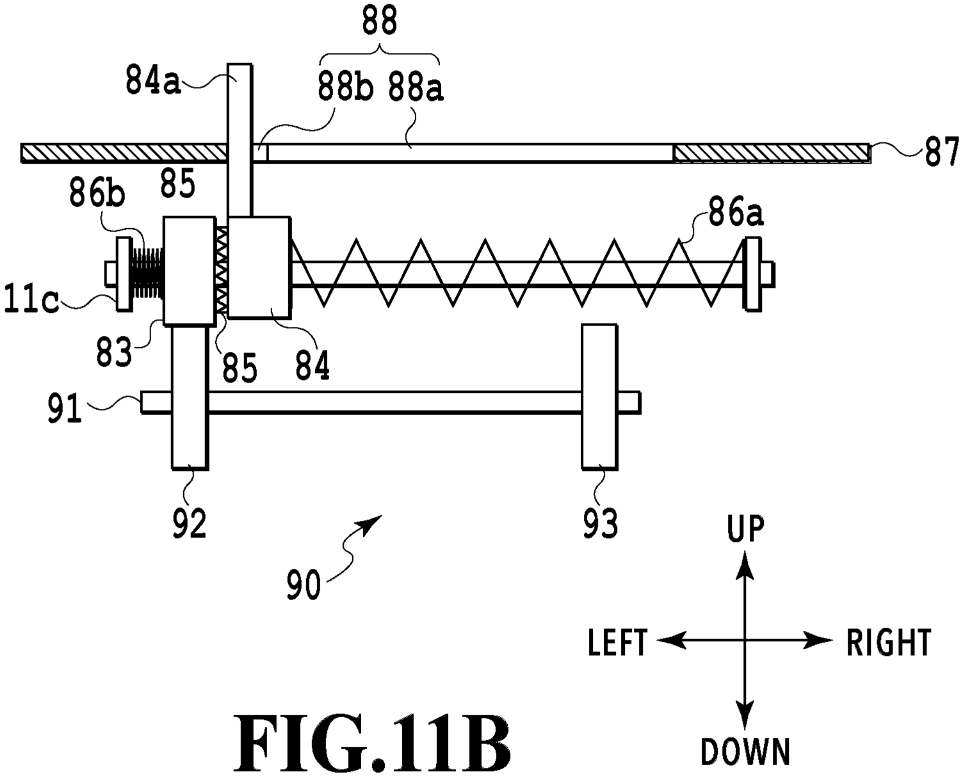

FIGS. 10A and 10B are diagrams describing an effect of the present embodiment. In detail, FIG. 10A illustrates the image printing apparatus including the rotatable contact unit 648 in the present embodiment as the contact unit for the drive switching, and in contrast, FIG. 10B illustrates an image printing apparatus including a not-rotatable contact unit 648' in a conventional technique.

In a case where an image is printed on the printing medium, the carriage 41 needs to scan at a constant speed equal to or greater than a predetermined value, and for this reason, it is necessary to provide a runway distance equal to or greater than a predetermined value. Additionally, it is necessary to periodically move the printing head onto a cap 52 to perform the maintenance operation of the printing head. Therefore, in a case of printing an image, it is necessary to make a scanning direction length of the scanning region of the carriage 41 greater than the maximum value of the width of the printable printing medium. As for the conventional contact unit 648', in a case where the contact unit 648' is arranged in a position overlapped with the scanning region of the carriage 41 in the printing for instance, there is a possibility that the carriage 41 and the contact unit 648' are put in contact with each other during the printing operation, and the drive switching operation occurs. Accordingly, it has been required to arrange the contact unit 648' outside the scanning region of the carriage 41 in the printing.

However, like the present embodiment, in the image printing apparatus including the rotatable contact unit 648, it is possible to withdrawn the contact unit 648 so as to prevent the contact with the carriage 41 in the image printing as illustrated in FIG. 10A. Accordingly, even if the contact unit 648 is provided within the range of the scanning region of the carriage 41 (within a range of a movement region in which the carriage 41 reciprocally moves), there is no obstacle to the printing operation. Therefore, it is possible to downsize the image printing apparatus by the reduced scanning direction length of the carriage 41, and the convenience in providing the image printing apparatus by the user is improved.

Additionally, in the conventional image printing apparatus, in a case where the planetary gear 633 and the input gear of each driving unit are arranged in parallel to the axial direction of the driving shaft 635, the width of the image printing apparatus is increased as the number of the driving units is increased. However, like the present embodiment, it is possible to suppress enlargement of the image printing apparatus by arranging the input gear of the driving unit on a trajectory of the pivoting of the planetary gear 633 and the planetary arm 634. Additionally, since the degree of freedom of the design such as arrangement of the driving unit is improved, it is possible to provide a downsized image printing apparatus.

As described above, according to the present embodiment, regarding the drive switching operation to select one of the multiple driving units to drive, it is possible to implement the stable switching operation independent of the position of the driving force transmission switching unit in a smaller apparatus than that in the conventional technique.

Second Embodiment

In the first embodiment, the biasing unit 647 drives the contact unit 648 by biasing the contact unit 648 in one direction and generating the friction force between the contact unit 648 and the rotating and driving rotatably supporting unit 646. In the first embodiment, the spring is used as the biasing unit 647 illustrated in FIG. 7; however, an elastic member such as rubber with a higher friction coefficient than that of the spring may be used. In order to increase the friction force while reducing reaction force of the biasing unit 647 in the pushing by the carriage 41, a surface of a sponge material such as urethane foam with which the rotatably supporting unit gear 645 and the contact unit 648 are each put in contact may be a composite material formed of a rubber member.

Third Embodiment

Problem to be Solved by Embodiments Hereafter

In Japanese Patent Laid-Open No. 2009-274304 (PTL 2), because the position of each of multiple driven units in which a motive power transmission unit is connected to the driven unit and transmits the driving force is only a first position, the time required for the driving force transmission switching operation may be long in some cases. For example, assuming an operation to perform the driving for the maintenance of the printing head in the first position and then perform the driving for feeding of the printing medium, and an operation to perform the driving of any other driven unit during the driving for feeding of the printing medium. In a case where those operations are continuously performed, it is necessary to perform a switching operation of the driven unit at least twice in a second position. The switching operation in the second position is accompanied by oscillation of the motive power transmission unit; therefore, the time required for the switching operation is particularly long.

To deal with this, an object here is to provide a printing apparatus and a control method thereof that can suppress the time required for driving force transmission switching by a driving force transmission unit.

A configuration of the printing apparatus according to a third embodiment is similar to that of the first embodiment (see FIG. 1). The driving force transmission unit 6 transmits the driving force to each driving unit that drives the corresponding operation mechanism of the first feeding unit 1, the second feeding unit 2, and the maintenance unit 5. All the units described above are fixed to the base 7 to form the printing mechanism.

A cross-sectional view of the printing apparatus according to the present embodiment is similar to that of the first embodiment (see FIG. 2).

A control configuration of the printing apparatus according to the present embodiment is similar to the first embodiment (see FIG. 3).

A driving force transmission configuration of the driving force transmission unit based on the driving force of the conveyance roller in the printing apparatus according to the present embodiment is similar to that of the first embodiment (see FIGS. 4A and 4B and FIGS. 5A and 5B).

Figure 12A:
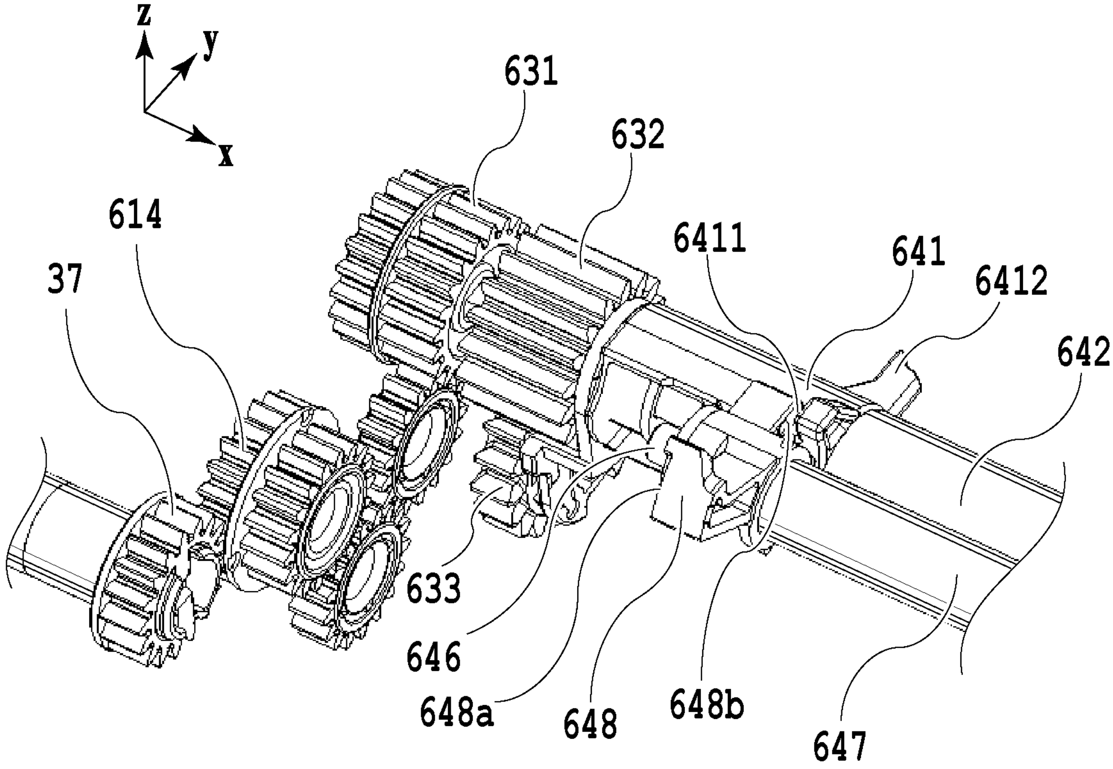
FIGS. 12A and 12B are diagrams describing a contact mechanism for contact with a carriage in a switching operation by the driving force transmission switching unit according to an embodiment of the present invention.
Figure 12B:
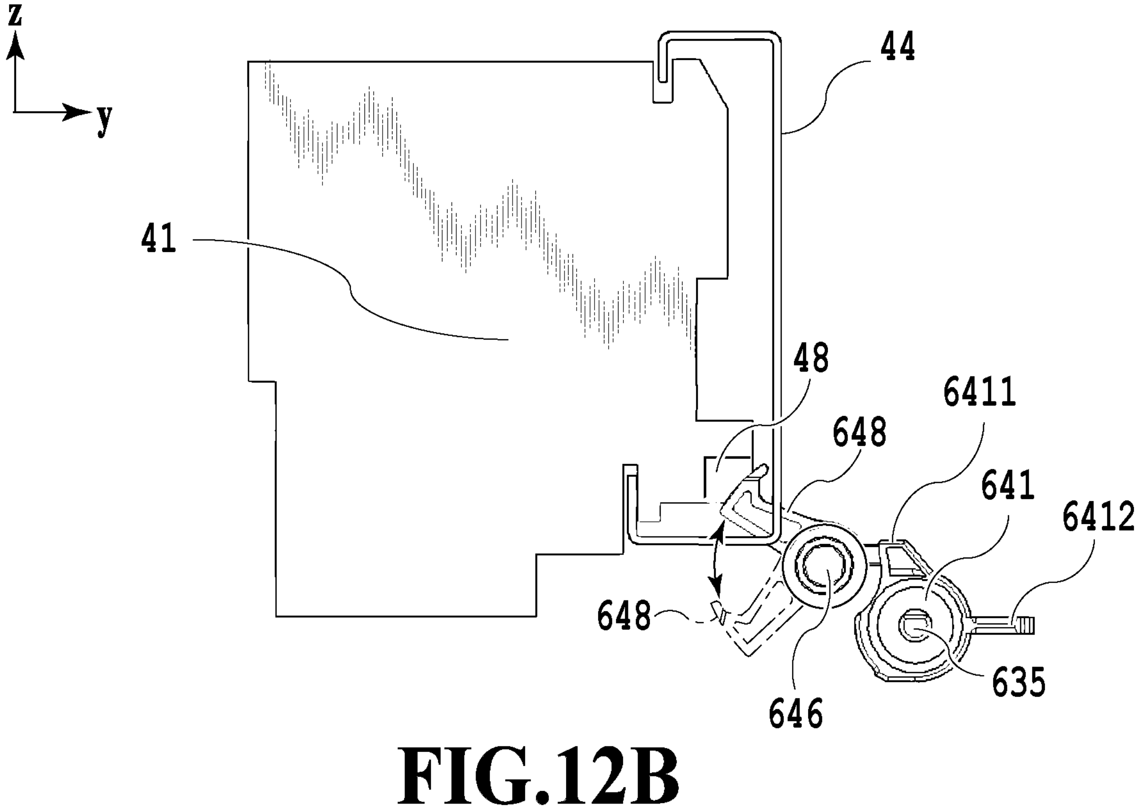

FIGS. 12A and 12B are diagrams describing a contact mechanism for the contact with the carriage in the switching operation by the driving force transmission switching unit of the above-described driving unit 6, and FIG. 12A illustrates a perspective view of the contact mechanism while FIG. 12B illustrates a side view of the contact mechanism, respectively. The carriage 41 is put in contact with the contact unit of the contact mechanism along with the movement (pushing toward the home position), and thus a position of the planetary arm 634 (accordingly, the planetary gear 633) of the driving force transmission unit 6 along the driving shaft 635 is determined.

As illustrated in FIGS. 12A and 12B, the contact mechanism is provided along the driving shaft 635 of the driving force transmission unit 6 and includes the rotatably supporting unit 646, the contact unit 648 pivotably provided to the rotatably supporting unit 646, and the biasing unit 647 as a spring biasing the contact unit in the −x direction. In the contact mechanism, the rotatably supporting unit 646 is rotatably supported by a predetermined portion (not illustrated) of the drive transmission unit 6 so as to be pivotable. Thus, the position of each of the above-described elements in the contact mechanism is determined. Additionally, a gear is provided to an end portion (illustration is omitted) of the rotatably supporting unit 646, and this gear is engaged with the driving shaft gear 643 at the end portion of the driving shaft 635. This makes it possible to pivot the rotatably supporting unit 646 by the pivoting of the driving shaft 635 as indicated by an arrow in FIG. 12B, and the contact unit 648 can pivot between a withdrawn position (dashed-dotted line) and a contact position (solid line) as described later.

The contact unit 648 is provided with a first contact surface 648*a* put in contact with a contact surface 48 of the carriage 41 and a second contact surface 648*b* put in contact with the contacted surface 6411 of the trigger holder 641 by further moving the carriage 41 in the axial direction (+x direction). Thus, in accordance with the movement amount (pushing amount) of the carriage 41, the driving force transmission switching unit is moved to the first lock position, the second lock position, the drive switching position, and the like described above with reference to FIG. 6. As illustrated in FIG. 12B, the driving force transmission switch contact portion 648*a* is arranged in a position projecting from the chassis 44 of the printing apparatus M and is arranged in a position in which the contact with the contact surface 48 of the carriage 41 can be made (the contact position; solid line in FIG. 12B). It is possible to move the driving force transmission switching unit by moving the carriage 41 in the axial direction in this state. On the other hand, it is also possible to pivot the contact unit 648 to be in a position in which the contact with the contact surface 48 of the carriage cannot be made (withdrawn position; dashed-dotted line in FIG. 12B) by pivoting the driving shaft 635 from the above-described contact position in a predetermined direction. Since the carriage 41 can be moved in such a positional relationship, it is possible to prevent a wide movement range of the carriage for the maintenance operation and the like.

A configuration of the driving force transmission switching unit according to the present embodiment is similar to that in the first embodiment (see FIG. 6).

Figure 13:
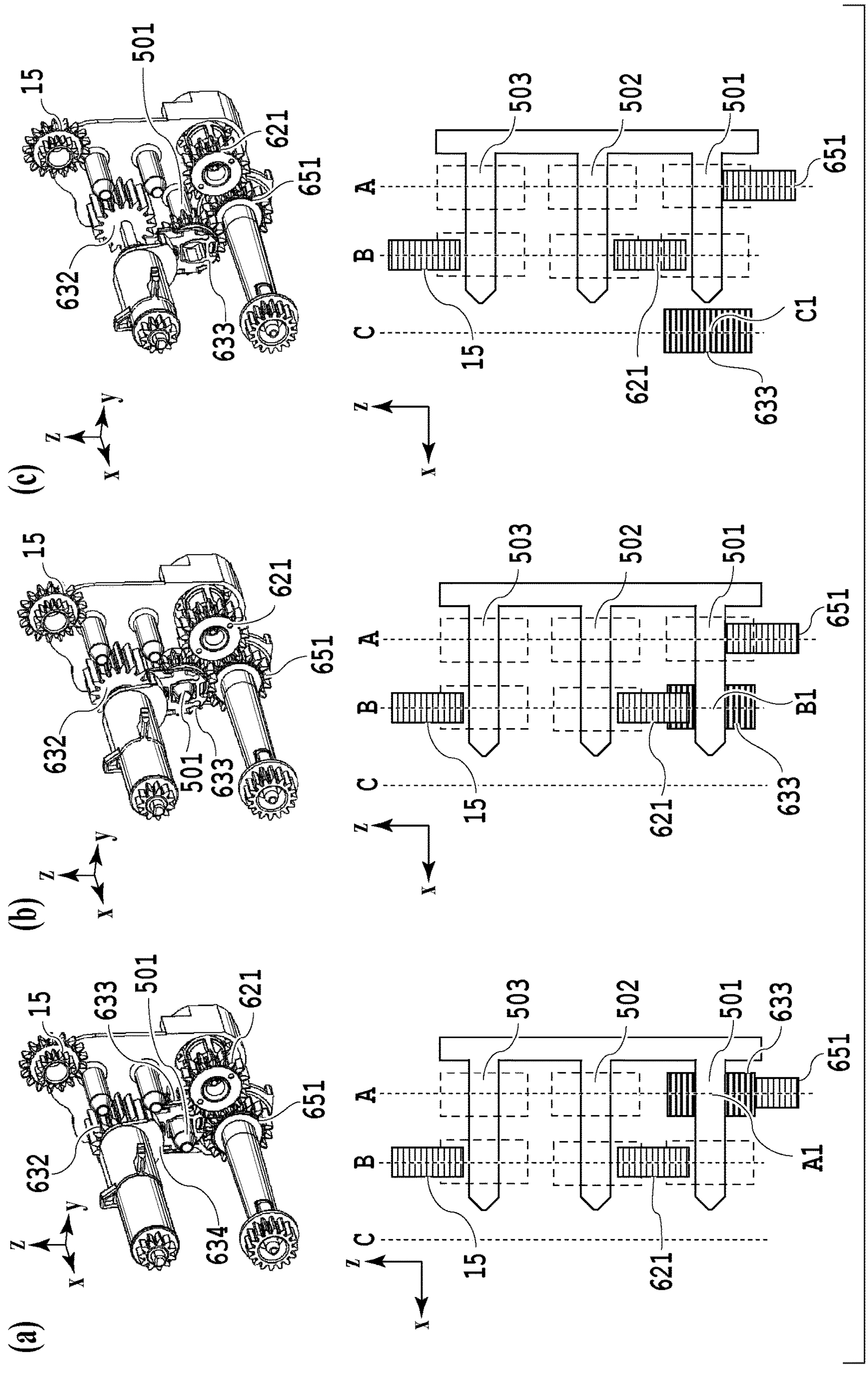
Figure 14:
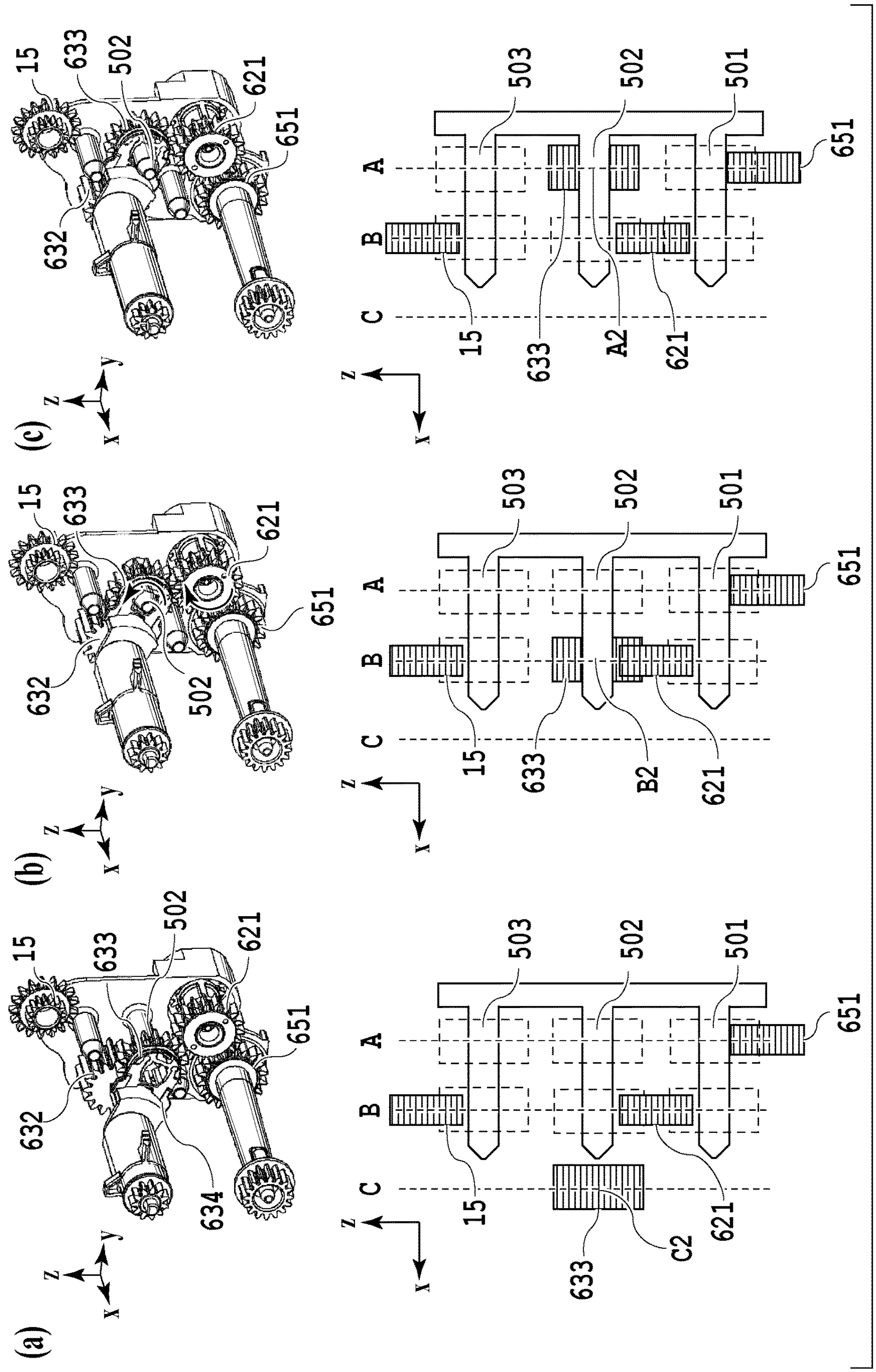
Figure 15:
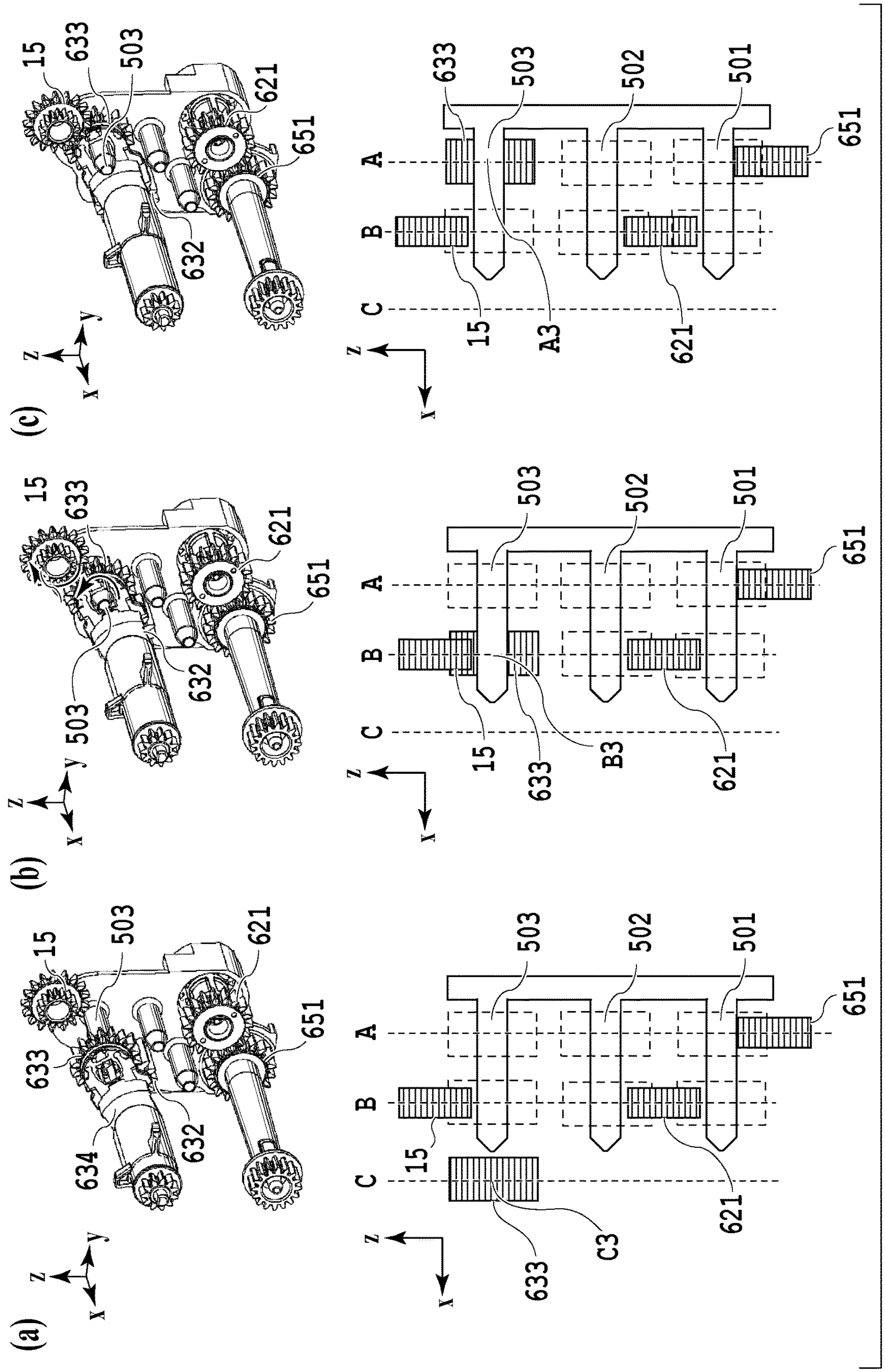

FIGS. 13 to 15 are diagrams describing the driving force transmission switching operation of the driving force transmission unit 6 according to the present embodiment and illustrate the switching operation relevant to each of the three supporting shafts 501, 502, and 503.

Reference signs (a) to (c) of FIG. 13 are perspective views and schematic views illustrating the switching operation relevant to the supporting shaft 501 (the first switching position) by illustrating the engagement relationship of the planetary gear and the like. Specifically, (a) to (c) of FIG. 13 illustrate the switching operation by illustrating the insertion relationship between the shaft hole in the fitting shaft 634B of the planetary arm 634 and the supporting shaft 501 along with the movement of the planetary arm 634 along the driving shaft 635 by the movement of the carriage 41.

(a) of FIG. 13 illustrates a state in which the planetary arm 634 is pushed into a position A along the supporting shaft 501 while the supporting shaft 501 is inserted through the shaft hole in the fitting shaft 634B of the planetary arm 634, and the planetary gear 633 is positioned in a position A1 corresponding to the position. This position corresponds to the first lock position illustrated in (a) and (d) of FIG. 6. In the position A1, the planetary gear 633 is then engaged with the sun gear B 632 on the driving shaft 635 and also engaged with the maintenance input gear 651. Thus, the driving force from the conveyance roller 32 transmitted through the driving shaft 635 is transmitted to the maintenance input gear 651 (corresponding to a first driving unit) through the sun gear B 632 and the planetary gear 633. This allows the maintenance unit 5 to perform the maintenance of the printing head by this driving force.

Likewise, (b) of FIG. 13 illustrates a state in which (the shaft hole in) the planetary arm 634 is pushed into a position B along the supporting shaft 501 while the supporting shaft 501 is inserted through the shaft hole in the planetary gear 633 and the like, and the planetary gear 633 is positioned in a position B1 corresponding to the position. This position corresponds to the second lock position illustrated in (b) and (e) of FIG. 6. In this position B1, the planetary gear 633 is engaged with the sun gear B 632 and also engaged with a second intermediate gear (the second feeding input gear) 621. Thus, the driving force transmitted through the driving shaft 635 and the sun gear B 632 is transmitted to the second intermediate gear 621 (corresponding to a second driving unit). This allows the second feeding unit 2 to feed the printing medium by the driving force. Thus, the driving force is transmitted to the driving unit of the maintenance unit 5 in one of the switching positions A1 and B1, and the driving force is transmitted to the driving unit of the second feeding unit 2 in the other one of the switching positions A1 and B1.

Likewise, (c) of FIG. 13 illustrates a state in which (the shaft hole in) the planetary arm 634 is pushed into a position C (a third position) along the supporting shaft 501 while the supporting shaft 501 is out of the shaft hole in the planetary gear 633 and the like, and the planetary gear 633 is positioned in a position C1 corresponding to the position. This position corresponds to the position illustrated in (c) and (f) of FIG. 6. In the position C1, which is a position other than the switching positions indicated by the above-described positions A and B, the shaft hole in the planetary gear 633 and the like and the supporting shaft 501 are disengaged. Additionally, the position C1 is a position in which the planetary gear 633 is not engaged with the sun gear B 632 and is not engaged with any of the drive input gears. In this position, the planetary arm 634 can pivot to switch the driving unit to which the driving force is transmitted.

Reference signs (a) to (c) of FIG. 14 are perspective views and schematic views illustrating the switching operation relevant to the supporting shaft 502 (the second switching position) by illustrating the engagement relationship of the planetary gear and the like as in the case of the above-described supporting shaft 501. Specifically, (a) to (c) of FIG. 14 illustrate the insertion relationship between the shaft hole in the fitting shaft 634B of the planetary arm 634 and the supporting shaft 502.

(a) of FIG. 14 illustrates a state in which (the shaft hole in) the planetary arm 634 is pushed into the position C along the supporting shaft 501 while the shaft hole in the planetary gear 633 and the like is not engaged with the supporting shaft 502, and the planetary gear 633 is positioned in a position C2 corresponding to the position. This position corresponds to the position illustrated in (c) and (f) of FIG. 6. In this position C2, the shaft hole in the planetary gear 633 and the like and the supporting shaft 501 are disengaged. Additionally, the position C1 is a position in which the planetary gear 633 is not engaged with the sun gear B 632 and is not engaged with any of the drive input gears. In this position, as with (c) of FIG. 13, the planetary arm 634 can pivot to switch the driving unit to which the driving force is transmitted and can be moved to another supporting shaft. For example, it is possible to position the planetary gear 633 into the position C2 from C1 illustrated in (c) of FIG. 13 by the pivoting of the planetary arm 634.

(b) of FIG. 14 illustrates a state in which (the shaft hole in) the planetary arm 634 is pushed into the position B along the supporting shaft 502 while the supporting shaft 502 (the second switching position) is inserted through the shaft hole in the planetary gear 633 and the like, and the planetary gear 633 is positioned in a position B2 corresponding to the position. This position corresponds to the second lock position illustrated in (b) and (e) of FIG. 6. In the position B2, the planetary gear 633 is engaged with the sun gear B 632 and is also engaged with the second intermediate gear (the second feeding input gear) 621 as with the above-described position B 1. Thus, the driving force transmitted through the driving shaft 635 and the sun gear B 632 is transmitted to the second intermediate gear 621 (corresponding to the second driving unit). This allows the second feeding unit 2 to feed the printing medium by the driving force.

(c) of FIG. 14 illustrates a state in which the planetary arm 634 is pushed into the position A along the supporting shaft 502 while the supporting shaft 502 is inserted through the shaft hole in the fitting shaft 634B of the planetary arm 634, and the planetary gear 633 is positioned in a position A2 corresponding to the position. This position corresponds to the first lock position illustrated in (a) and (d) of FIG. 6. Additionally, in the position A2, the planetary gear 633 is engaged with the sun gear B 632 on the driving shaft 635 but is not engaged with any other drive input gears. For example, this makes it possible to disconnect the driving force transmission to the second intermediate gear 621 (corresponding to the second driving unit) illustrated in (b) of FIG. 14 by moving the driving force transmission switching unit to the position A2.

Reference signs (a) to (c) of FIG. 15 are perspective views and schematic views illustrating the switching operation relevant to the supporting shaft 503 (the third switching position) by illustrating an engagement relationship between planetary gears and the like as in the case of the above-described supporting shafts 501 and 502.

(a) of FIG. 15 illustrates a state in which (the shaft hole in) the planetary arm 634 is pushed into the position C along the supporting shaft 501 while the shaft hole in the planetary gear 633 and the like is not engaged with the supporting shaft 503, and the planetary gear 633 is positioned in a position C3 corresponding to the position. This position corresponds to the position illustrated in (c) and (f) of FIG. 6. In the position C3, the shaft hole in the planetary gear 633 and the like and the supporting shaft 501 are disengaged. Additionally, the position C3 is a position in which the planetary gear 633 is not engaged with the sun gear B 632 and is not engaged with any of the drive input gears. In this position, as with (c) of FIG. 13 and (a) of FIG. 14, the planetary arm 634 can pivot to switch the driving unit to which the driving force is transmitted and can be moved to another supporting shaft.

(b) of FIG. 15 illustrates a state in which (the shaft hole in) the planetary arm 634 is pushed into the position B along the supporting shaft 503 while the supporting shaft 503 is inserted through the shaft hole in the planetary gear 633 and the like, and the planetary gear 633 is positioned in a position B3 corresponding to the position. This position corresponds to the second lock position illustrated in (b) and (e) of FIG. 6. In the position B3, the planetary gear 633 is engaged with the sun gear B 632 and is also engaged with a first intermediate gear (the first feeding input gear) 15. Thus, the driving force transmitted through the driving shaft 635 and the sun gear B 632 is transmitted to the first intermediate gear 15 (corresponding to a third driving unit). This allows the first feeding unit 1 to feed the printing medium by the driving force.

(c) of FIG. 15 illustrates a state in which the planetary arm 634 is pushed into the position A along the supporting shaft 503 while the supporting shaft 503 is inserted through the shaft hole in the fitting shaft 634B of the planetary arm 634, and the planetary gear 633 is positioned in a position A3 corresponding to the position. This position corresponds to the first lock position illustrated in (a) and (d) of FIG. 6. Additionally, in the position A3, the planetary gear 633 is engaged with the sun gear B 632 on the driving shaft 635 but is not engaged with any other drive input gears. For example, this makes it possible to disconnect the driving force transmission to the first intermediate gear 15 illustrated in FIG. 10B by moving the driving force transmission switching unit to the position A3.

FIG. 16 is a diagram of the driving force transmission switching by the driving force transmission unit described in FIGS. 13 to 15 illustrated by using a relationship between the supporting shaft and the position into which the planetary gear is pushed. For example, in a case where the printing is started in the printing apparatus M, the printing apparatus M performs the maintenance of the printing head operation and waits for the transferring of the print data from the host apparatus. Thereafter, the print data is transferred, and the feeding is started. In this case, as illustrated in FIG. 16, the planetary gear 633 (the planetary arm 634) is moved from the pushing position A1 of the planetary gear 633 relevant to the supporting shaft 501 to the pushing position B1 relevant to the same supporting shaft 501. Thus, in the present embodiment, it is possible to switch the driving unit to which the driving force is transmitted only by the movement of the planetary arm 634 along the driving shaft 635. Additionally, in a case where a trouble in the feeding such as paper jamming occurs during the feeding operation, the planetary gear 633 (the planetary arm 634) is moved from the pushing position B2 or B3 of the planetary gear 633 to the pushing position A2 or A3 relevant to the same supporting shaft. In this case, it is also possible to switch the driving unit to which the driving force is transmitted (to disconnect) only by the movement of the planetary arm 634 along the driving shaft 635.

FIG. 17 is a diagram illustrating the driving force transmission switching by the driving force transmission unit according to another embodiment of the present disclosure and is a diagram similar to FIG. 16. As illustrated in FIG. 17, a configuration in which the pushing position B1 of the planetary gear 633 relevant to the supporting shaft 501 is a position in which the planetary gear 633 is engaged with the drive input gear 15 related to the first feeding may be applicable. In this configuration, it is also possible to switch the driving unit to which the driving force is transmitted from the maintenance unit 5 to the first feeding unit 1 only by the movement of the planetary arm 634 along the driving shaft 635.

As it can be seen from the above descriptions relevant to the FIGS. 16 and 17, it is possible to form gear arrangement in which the engagement or the disengagement between the planetary gear and the drive input gear is set individually for each supporting shaft. As a result, the type of the driving unit that can be switched only by the movement of the planetary arm 634 along the driving shaft 635 is not limited to the above-described embodiment. Additionally, the number of the supporting shafts may be increased while taking into consideration an arrangement space of the parts and the like. Moreover, the positions along the supporting shaft are not limited to the above-described positions A, B, and C, and the number of the positions may also be increased depending on the usage of the printing apparatus implemented.

Figure 18:
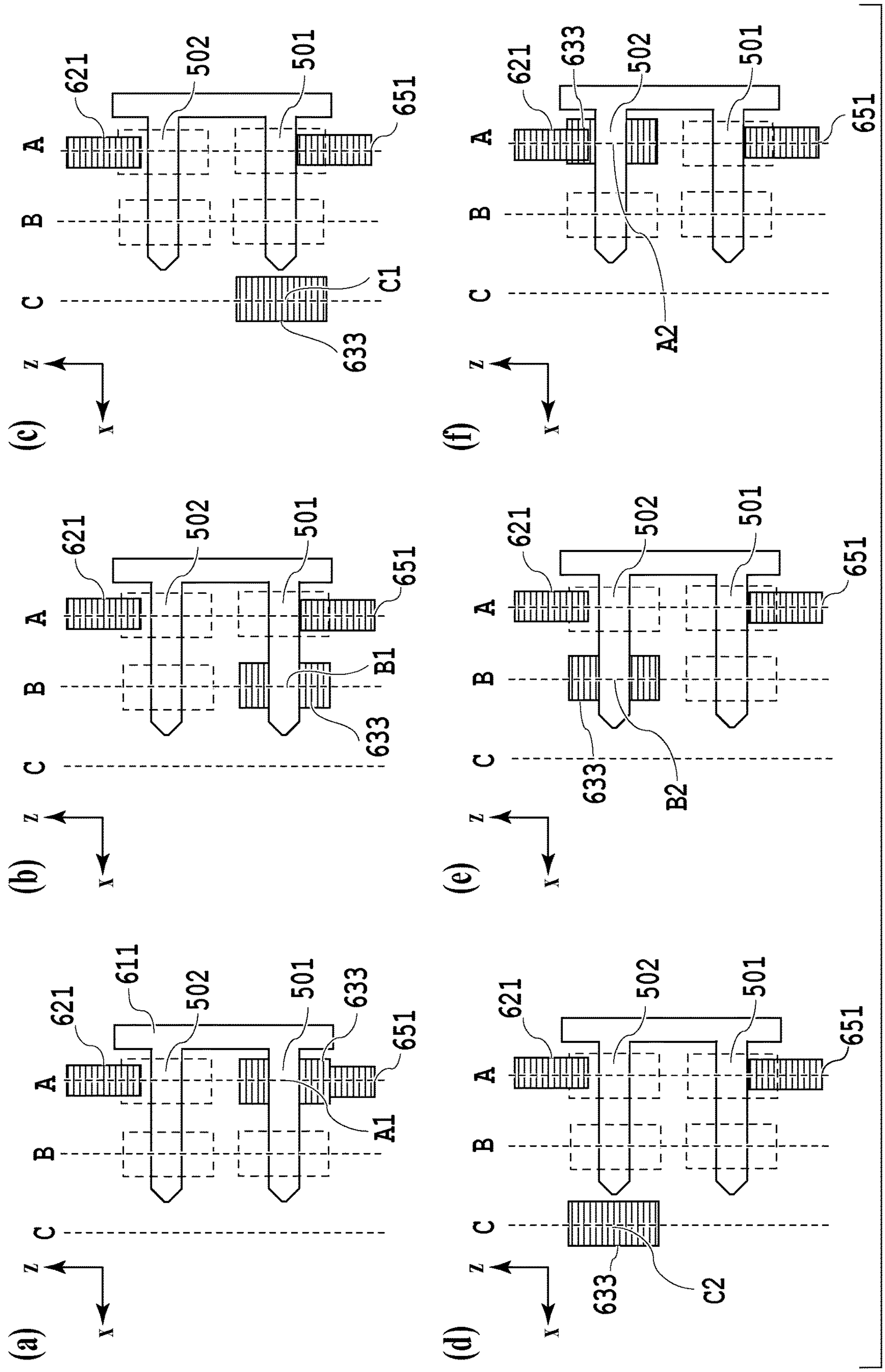
FIG. 18 is a diagram describing a driving force transmission switching operation according to a comparative example.

(a) to (f) of FIG. 18 are diagrams describing the driving force transmission switching operation according to a comparative example and illustrate diagrams similar to FIGS. 13 to 15. The comparative example indicates the switching operation relevant to each of the two supporting shafts 501 and 502.

For example, in a case where the driving unit to which the driving force is transmitted is switched from the maintenance unit to the feeding unit, in the comparative example, first, the planetary gear 633 passes through the position B1 as an intermediate position illustrated in (b) of FIG. 18 from the position A1 relevant to the supporting shaft 501 that is the position in which the driving force is transmitted to the maintenance unit illustrated in (a) of FIG. 18. Thereafter, after the pushing position is changed to the position C1 illustrated in (c) of FIG. 18, the planetary arm pivots to move to the position C2 relevant to the supporting shaft 502 illustrated in (d) of FIG. 18. Then, the planetary gear 633 passes through the position B2 as an intermediate position illustrated in (e) of FIG. 18 to move to the position A2 related to the feeding illustrated in (e) of FIG. 18. This comparative example is similar to the above-described configuration relevant to PTL 1, and it is necessary for the planetary arm to move from the position related to the maintenance unit illustrated in (a) of FIG. 18 to the position related to the feeding illustrated in (e) of FIG. 18 by way of the position in which the planetary arm can pivot illustrated in (d) of FIG. 18. Therefore, relatively long time is required to start the feeding.

As described above, according to the embodiment of the present disclosure, it is possible to set the engagement or the disengagement between the planetary gear engaged with the sun gear and the drive input gear only by the movement of the planetary arm 634 along the driving shaft 635. For example, this makes it possible to make time from the waiting time for the maintenance to starting the feeding operation of the printing medium relatively short. Additionally, in a case where a feeding trouble occurs during the feeding, it is possible to make time from the driving for the feeding to the disconnection of the driving force relatively short.

Additionally, according to the present embodiment, as can be clear from FIG. 16, the second driving unit corresponding to the second feeding input gear 621 can transmit the drive by both the supporting shaft 501 (the first switching position) and supporting shaft 502 (the second switching position). Here, assuming an operation to perform the driving for the maintenance of the printing head in the position A1 and then perform the driving for feeding of the printing medium in the position B1, and an operation to perform the drive switching for processing to solve paper jamming in the position A2 during the driving for the feeding of the printing medium in the position B2. In a case where those operations are continuously performed, in the present embodiment, it is sufficient to perform the driving unit switching operation once in the position C1 or C2. Thus, it is possible to suppress the time required for the driving force transmission switching by the driving force transmission unit more than the configuration described in PTL 1.

Likewise, in the example illustrated in FIG. 17, the second driving unit corresponding to the first feeding input gear 15 also can transmit the drive by both the supporting shaft 501 (the first switching position) and supporting shaft 503 (in this example, corresponding to the second switching position). Additionally, as with the above descriptions, it is sufficient to perform the driving unit switching operation once in the position C1 or C3 to switch the driving unit.

Fourth Embodiment

Figure 19A:
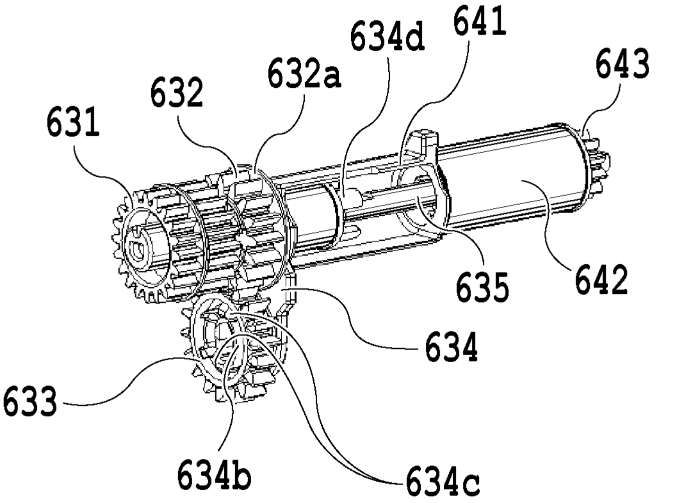
FIGS. 19A and 19B are perspective views describing a driving force switching unit according to a fourth embodiment.
Figure 19B:
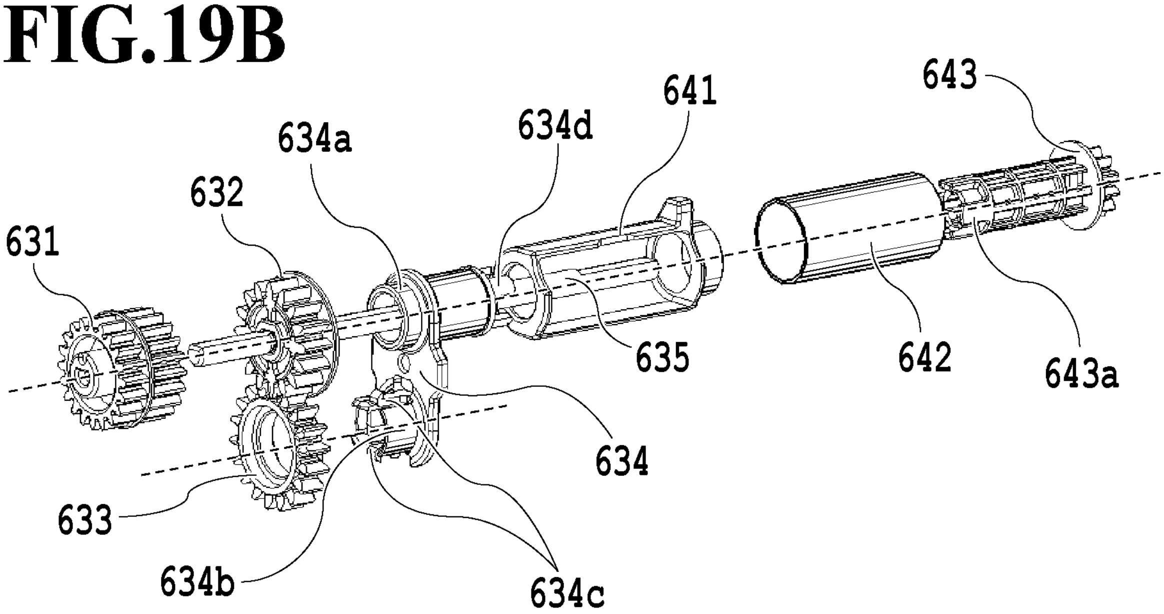

FIGS. 19A and 19B are perspective views describing the driving force switching unit according to the fourth embodiment and are diagrams similar to FIGS. 5A and 5B according to the third embodiment. Here, FIG. 19A illustrates the driving force switching unit after assembling while FIG. 19B illustrates the driving force switching unit before assembling, and these diagrams illustrate a view from the opposite direction of FIGS. 5A and 5B.

In the assembling, the sun gear B 632 is assembled to a guiding shaft 634*a* provided to the planetary arm 634, and then the planetary gear 633 is assembled to the fitting shaft 634*b*. A hook unit 634*c* is provided to a part of the fitting shaft 634*b*, and this can prevent the detachment of the planetary gear 633 from the planetary arm 634. That is, in the movement of the driving force switching unit along the driving shaft 635, as illustrated in FIGS. 5A and 5B, the driving force input gear of each driving unit and the planetary gear 633 need to pass through a clearance between their teeth. In this case, since an angle of the engagement between the driving force input gear of the driving unit and the planetary gear 633 is different depending on the supporting shaft, mutual interference may occur. As a result, there is a possibility that the planetary gear 633 is detached from the planetary arm 634, and in order to prevent this, the hook unit 634*c* is provided in around two portions. Additionally, the hook unit 634*c* is inclined inward (toward the center in a radial direction of the fitting shaft 634*b*) in a case where the planetary gear 633 is detached from the planetary arm 634 due to the above-described interference. To deal with this, the hook unit 634*c* has a hook shape projecting outward (outward in the radial direction of the fitting shaft 634*b*), and the hook shape is desirably a shape to dig into the planetary arm in accordance with the above-described inclination.

A flange unit 632*a* provided to the sun gear B 632 is restricted in the axial direction of the driving shaft 635 by a side surface of the planetary gear 633, and this prevents the detachment of the sun gear B 632 from the guiding shaft 634*a* provided to the planetary arm 634. As a result, the sun gear B 632 and the planetary gear 633 are held by the planetary arm 634.

Figure 20:
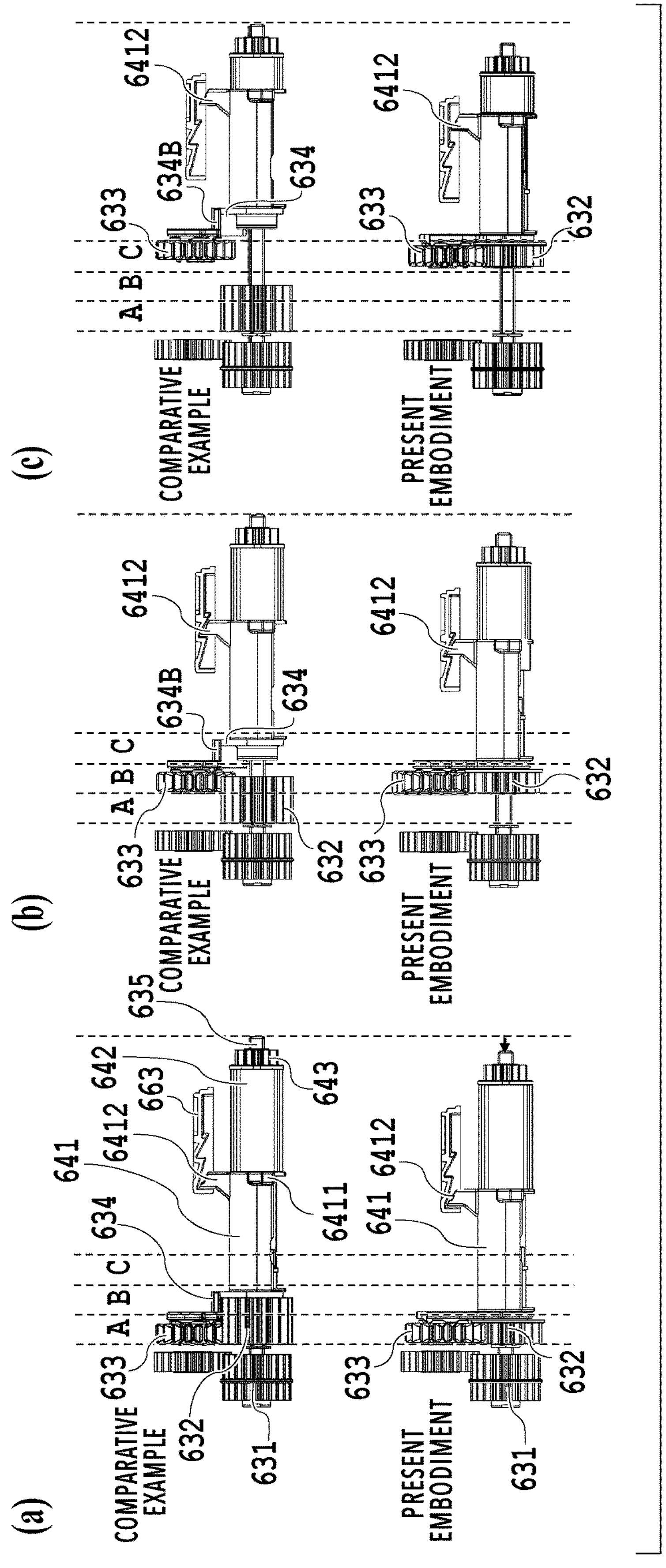
FIG. 20 is a diagram describing a difference between the driving force switching unit according to the fourth embodiment and a configuration of a comparative example thereof.

Reference signs (a) to (c) of FIG. 20 are diagrams describing a difference between the driving force switching unit according to the fourth embodiment and a configuration of a comparative example thereof and are diagrams similar to FIG. 6 according to the first embodiment similar to the present embodiment. (a) and (b) of FIG. 20 illustrate the drive switching unit and the driving unit to which the driving force is transmitted in a state of the disconnection (the position A) and a state of the connection (the position B) of the driving force, and (c) of FIG. 20 illustrates a state in which the planetary arm can pivot (the position C).

As illustrated in FIG. 20, in this comparative example configuration (as with the third embodiment), the sun gear B 632 is fixed so as not to move along the driving shaft 635. Additionally, the planetary gear 633 is hooked to the planetary arm 634, and the planetary gear 633 and the planetary arm 634 and the trigger holder 641 move along the driving shaft 635 as described above in the third embodiment. In contrast, in the present embodiment, the sun gear B 632, the planetary gear 633 and the planetary arm 634, and the trigger holder 641 are formed to be movable along the driving shaft 635. Note that, in the position C illustrated in (c) of FIG. 20, the comb teeth (634A) of the planetary arm 634 and the comb teeth (643A) of the driving shaft gear 643 are engaged with each other. This allows the planetary arm 634 to pivot about the driving shaft 635 by the driving shaft gear 643 rotating integrally with the driving shaft 635 and to move to a predetermined supporting shaft.

In the comparative example configuration, a curved portion 634B is provided to the planetary arm 634, and thus a certain interval is provided between the planetary arm 634 and the sun gear B 632 along the driving shaft 635. That is, in the comparative example configuration, a width of the planetary gear 633 is smaller than a width of the sun gear B 632, and the planetary gear 633 is engaged with the sun gear B 632 while changing the region of the engagement with the sun gear B 632 in accordance with the above-described positions A and B. In contrast, in the present embodiment, a configuration in which an amount of the engagement between the sun gear B 632 and the planetary gear 633 is constantly the same is applied. Thus, it is unnecessary to provide the curved portion to the planetary arm 634 to provide the interval between the planetary arm 634 and the sun gear B 632. As a result, it is possible to reduce the width of the driving force switching unit by the size of the curved portion of the planetary arm 634, that is, by the size illustrated in (b) of FIG. 20, and it is possible to reduce a width of the printing apparatus.

Figure 21:
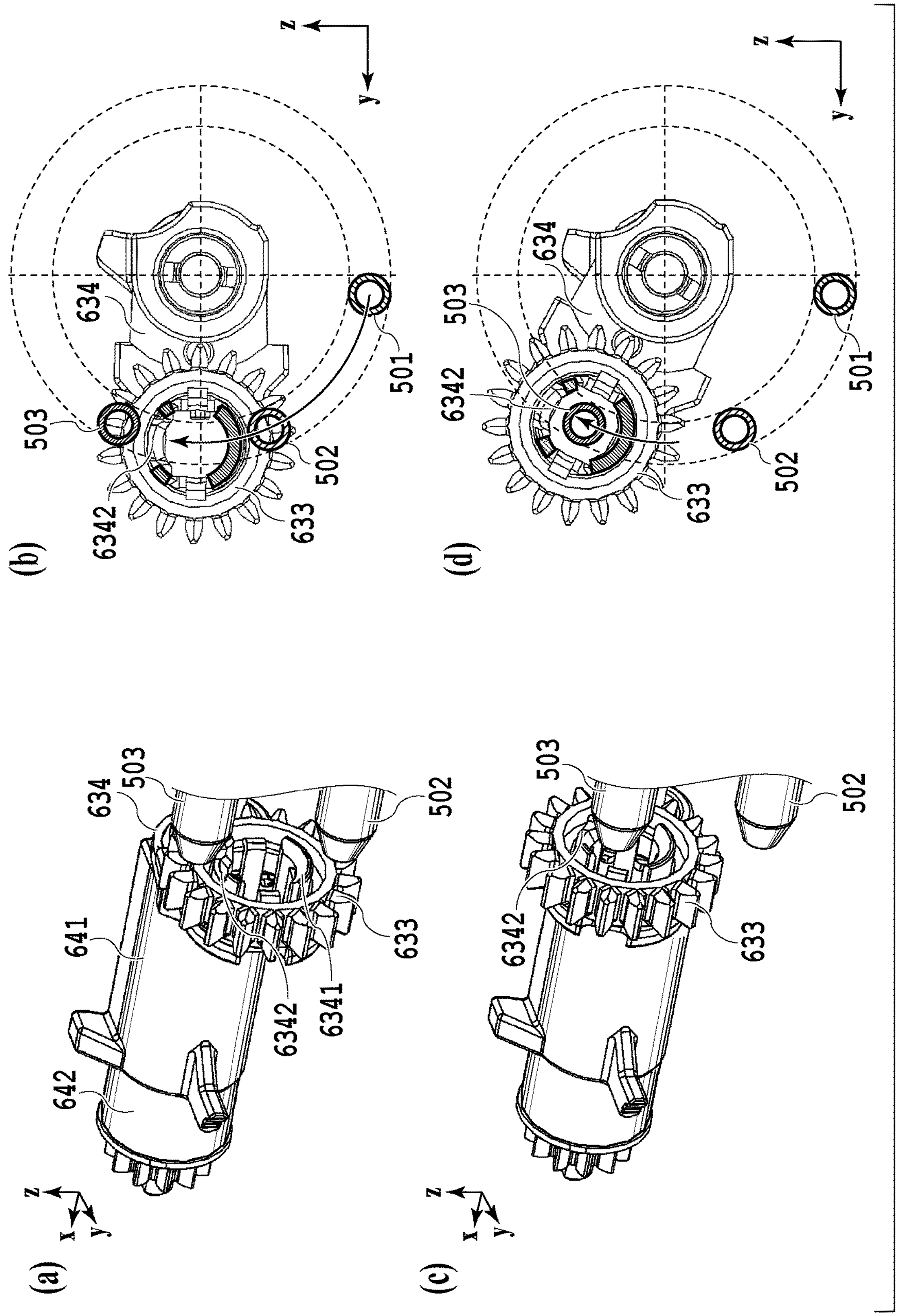
FIG. 21 is a diagram describing a configuration of a drive switching unit according to a fifth embodiment.

Fifth Embodiment (a) to (d) of FIG. 21 are diagrams describing a configuration of the drive switching unit according to a fifth embodiment.

(a) of FIG. 21 illustrates a state in which a tip of the supporting shaft is not inserted through the shaft hole in the planetary arm 634 well even with the pivoting of the planetary arm 634 by a predetermined amount in the position C. Additionally, (b) of FIG. 21 illustrates a cross-sectional view of a major portion in (a) of FIG. 21. As described above in relation to the first embodiment (or the third embodiment), for example, in a case where the driving force transmission is switched from the supporting shaft 501 to the supporting shaft 503 in the position C, the planetary arm 634 pivots by a predetermined amount. These diagrams illustrate a state in which the rotation amount is less due to some kind of cause and, for example, the rotation is stopped between the supporting shaft 502 and the supporting shaft 503. In this case, as usual operation control, after the pivoting for the driving force switching, whether the planetary gear 633 is inserted through the supporting shaft 503 is determined, and the switching operation of the driving unit is completed. Thereafter, in order to move from the position C to the position A or the position B, the clutch is unlocked, and the planetary gear 633 is biased by the trigger holder spring 642 in the −x direction and put between the planetary arm 634 and the supporting shaft 502 or the supporting shaft 503. However, since the supporting shaft 503 is not inserted through the shaft hole in the planetary gear 633, no driving force is transmitted to the corresponding driving unit.

In contrast, in the present embodiment, as illustrated in (a) of FIG. 21, it is possible to deal with the above-described problem by providing a notch 6342 to a sleeve portion 6341 of the planetary gear. That is, after the switching operation of the driving unit is completed, a direction of the revolution of the planetary gear by the driving force transmission and a direction of the rotation of the planetary arm from the supporting shaft 501 to the supporting shaft 503 coincide with each other. For example, after the switching operation of the driving unit is completed, the planetary gear 633 revolves for the feeding and the maintenance. The rotation allows for the transition from the state of (a) and (b) of FIG. 21 to the state illustrated in (c) and (d) of FIG. 21 with no interference of the notch 6342 with the shaft tip of the supporting shaft 503. That is, even if the switching of the driving unit fails, it is possible to make up a shortage of the rotation amount by the rotation operation by the driving force transmitted later, and it is possible to transmit the driving force well to the driving unit subjected to the switching and to which the driving force is transmitted.

As described above, according to the present embodiment, it is possible to complete the driving force transmission switching operation with no obstacle even if the rotation amount of the planetary arm 634 is less due to some kind of cause for instance, and it is possible to implement a reliable printing apparatus.

Figure 22:
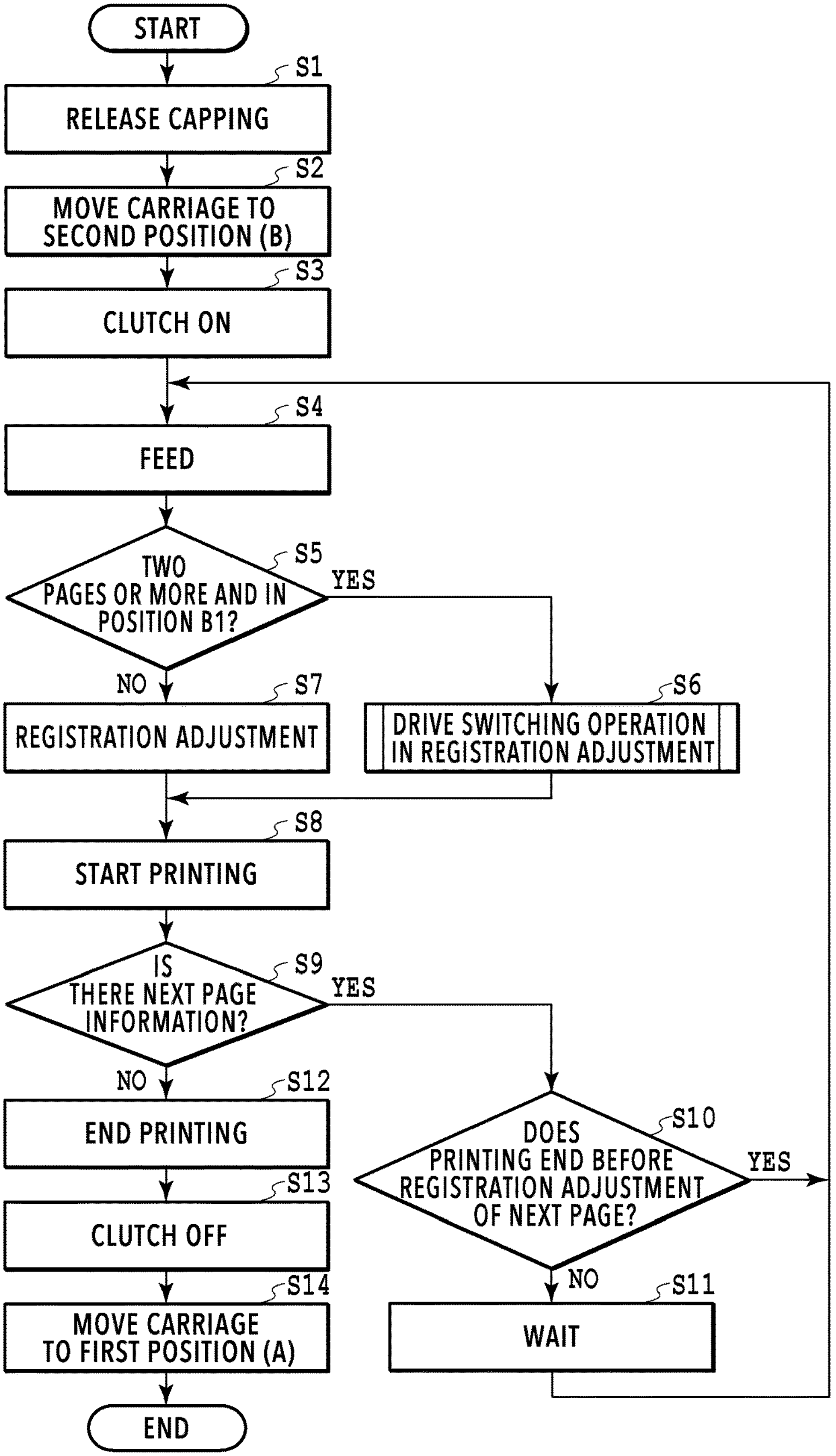
FIG. 22 is a flowchart illustrating the driving force transmission switching operation.

FIG. 22 is a flowchart illustrating the driving force transmission switching operation according to the embodiment of the present disclosure.

Once the print operation is started, first, capping for the maintenance of the printing head is released (step S1). In this process, for the capping release operation, the position of the driving force transmission switching unit is the position A1 illustrated in FIG. 16. Next, once a feeding instruction is received, the driving force switching unit is moved to the position B1 as a feeding position by moving the carriage 41, and a state in which the driving force can be transmitted to the driving unit for the corresponding feeding is obtained (step S2). In the embodiment described above with reference to FIG. 16, the transition from the step S1 to the step S2 corresponds to the movement of the planetary gear 633 from the position A1 to the position B1 relevant to the supporting shaft 501. Thus, regarding one supporting shaft, it is possible to switch the driving unit to which the driving force is transmitted by only moving the carriage. In the position B1, the clutch 6632 of the driving force transmission unit 6 and the lock member 6412 of the trigger holder 641 are engaged (also referred to as "clutch ON") to hold the position B1 (step S3). In this position, the driving force of the conveyance motor 31 is transmitted to the driving force transmission unit 6 through the conveyance roller 32, and with the driving force transmission unit 6 transmitting the driving force to the driving unit of the second feeding roller 25, the printing medium is fed (step S4). Next, whether the number of the printing mediums is two or more and also the driving force transmission switching position is the position B1 is determined (step S5).

If the number of the printing mediums is two or more and also the driving force transmission switching position is the position B1, the registration adjustment, which is an operation to align tip portions of the printing mediums, is performed by the conveyance operation by the conveyance roller 32. Therefore, before the registration adjustment is executed, the driving force transmission switching position is moved from the position B1 to the position C1. In the position C1, it is possible to move the shaft hole in the fitting shaft 634B of the planetary arm 634 to the driving force transmission switching position C2 relevant to the supporting shaft 502 by the pivoting of the planetary arm 634. Additionally, it is possible to calculate the predetermined amount of the pivoting of the planetary arm in this process from a rotation angle required for the planetary gear 633 to reach from the supporting shaft 501 to the supporting shaft 502. Moreover, the carriage 41 is moved from the position C2 to set the driving force transmission switching position to the position B2, and the position B2 is held by clutch ON (step S6). Then, the printing medium is fed by the second feeding unit, and the printing is started (step S8).

On the other hand, if it is determined in the step S5 that it is other than a state in which the number of the printing mediums is two or more and also the driving force transmission switching position is the position B 1, that is, if it is determined that the number of the printing medium is one and the driving force transmission switching position is the position C1, the registration adjustment is performed immediately (step S7). This is because it is unnecessary to change the driving force transmission switching position for the registration adjustment. Then, as described above, the driving force transmission switching position is moved to the position B1, and the printing is started (step S8).

Once the printing is started in the step S8 after performing the above-described step S6 or S7, next, whether there is next page information to be printed is determined (step S9).

If there is the next page information to be printed, whether the printing on the preceding printing medium ends before the printing medium for the next page is fed and the registration adjustment is performed is determined (step S10). This determination can be made by the calculation based on the size of the printing medium, the length of the conveyance route, and the like. If the printing on the preceding printing medium ends under the above-described condition, the feeding operation of the next printing medium is performed (step S4). On the other hand, if the printing on the preceding printing medium does not end under the above-described condition, the feeding is kept in the waiting state to avoid the concurrent performance of the registration adjustment and the feeding operation (step S11). This is because, for example, there is a possibility that the next unnecessary paper sheet may be fed if the second feeding roller 25 is driven unnecessarily. After the waiting, once it is detected that the printing on the preceding printing medium ends, the feeding operation is performed (step S4).

In step S9, if it is determined that there is no next page information to be printed, the print ends (step S12). The clutch is set to OFF (step S13), and the driving force switching position is moved to the position A1 (step S14). In this case, the carriage waits in the maintenance unit to protect the printing head, the recovery operation is performed, the capping is performed, and the operation ends.

As described above, in the technique of the comparative example illustrated in FIG. 18, for example, in a case where the capping is released, and thereafter the feeding operation is performed, it is necessary to move the driving force transmission switching position A1 to C1 by moving the carriage. Then, after the planetary arm pivots from the supporting shaft 501 to the supporting shaft 502, and the driving force transmission switching position is moved from C1 to C2, the carriage is moved, and the driving force transmission switching position is moved from C2 to A2. In contrast, in the present embodiment, as illustrated in FIG. 16, it is possible to perform the feeding only by moving the driving force transmission switching position A1 to the position B1 regarding the supporting shaft, that is, without the pivoting operation of the planetary arm for the supporting shaft switching. This makes it possible to reduce the time after the capping release operation to the feeding operation. Additionally, it is also possible to perform the feeding in the position B2 by moving the driving force transmission switching position from C1 to C2 by the pivoting operation of the planetary arm during the registration adjustment and the carriage movement thereafter. Therefore, even in a case where the paper jamming processing is performed, it is possible to quickly deal with the paper jamming by moving from B2 to A2 to disconnect the driving force transmission to the driving unit.

OTHER EMBODIMENTS

Although the image printing apparatus is described as an example in the above-described embodiments, it is possible to apply the thought of the present disclosure to an apparatus including the above-described driving mechanism.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure relates to a drive switching operation to select one of multiple driving units to drive, and it is possible to achieve downsizing as compared with the conventional technique.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-140859 and No. 2022-140869, filed Sep. 5, 2022, which are hereby incorporated by reference wherein in their entirety.

What is claimed is:

1. A printing apparatus, comprising:

a carriage on which a printing head is mounted and that can move reciprocally in a first direction;

a motor configured to generate driving force;

a driving shaft extending in the first direction and driven to rotate by the driving force;

a plurality of driving units driven by the driving force transmitted through the driving shaft;

a plurality of supporting shafts, each supporting shaft of the plurality of supporting shafts corresponding to a respective one of the plurality of driving units;

a switching unit including a planetary gear and a planetary arm supporting the planetary gear relative to the driving shaft such that the planetary gear pivots about the driving shaft as a center axis and a movement unit configured to move the planetary arm relative to the driving shaft, each of the planetary gear and the planetary arm having a shaft hole into which any one of the plurality of supporting shafts can be inserted, wherein the planetary gear is configured to selectively engage one of the plurality of supporting shafts to transmit the driving force to the driving unit corresponding to the engaged supporting shaft when the one of the plurality of supporting shafts is inserted into the shaft hole; and a contact unit rotatably supported by a supporting unit to move between a contact position in which the contact unit contacts the carriage and a non-contact position in which the does not contact the carriage, the contact unit being configured to move with the carriage in the contact position, wherein movement of the contact unit moves the movement unit to cause the switching unit to switch the transmission destination of the driving force.

2. The printing apparatus according to claim 1, wherein the switching unit further includes a sun gear.

3. The printing apparatus according to claim 1, wherein the carriage has a scanning region corresponding to a region in which the carriage reciprocally moves in the first direction to perform image printing by the printing head, and wherein the contact unit is attached to the switching unit and also provided in the scanning region.

4. The printing apparatus according to claim 3, wherein the supporting unit extends in the first direction and can be rotated by the driving force.

5. The printing apparatus according to claim 4, wherein, when the contact unit is in the contact position and in contact with the carriage, the contact unit is moved in the first direction together with the carriage, and wherein a lock portion provided on the movement unit is moved by the movement of the contact unit.

6. The printing apparatus according to claim 5, wherein the lock portion is positionable in a first lock position in which connection with one driving unit of the plurality of driving units is made or a second lock position in which connection with another driving unit of the plurality of driving units is made.

7. The printing apparatus according to claim 1, further comprising a biasing unit configured to bias the contact unit in a predetermined direction.

8. The printing apparatus according to claim 7, further comprising a conveyance roller configured to convey a printing medium along a second direction orthogonal to the first direction, wherein, when the conveyance roller rotates in a forward direction for feeding the printing medium from a feeding unit to a printing unit including the printing head, the contact unit is held in a first position in which contact with the carriage cannot be made.

9. The printing apparatus according to claim 8, wherein, when the conveyance roller rotates in a direction opposite to the forward direction, the contact unit is held in a second position in which the contact with the carriage can be made.

10. The printing apparatus according to claim 9, further comprising a sliding member on which the carriage slides, wherein the sliding member includes a notched portion to which the contact unit projects and a restriction member configured to hold the contact unit in the first position, and wherein a height of the first position is equal to or smaller than a height of the notched portion.

11. The printing apparatus according to claim 8, wherein the plurality of driving units are a maintenance unit configured to perform maintenance and a supplying unit configured to supply the printing medium.

12. The printing apparatus according to claim 7, wherein the biasing unit is formed of an elastic member.

13. The printing apparatus according to claim 1, wherein, during switching of the transmission destination of the driving force among the plurality of driving units, any one of the plurality of supporting shafts is inserted into the shaft hole.

14. The printing apparatus according to claim 1, wherein the switching unit is movable to a drive switching position in which the planetary arm is pivotable to switch the transmission destination of the driving force, and wherein, after the drive switching position is established and the carriage moves in a direction away from the contact unit, the movement unit is biased to move the switching unit from the drive switching position to a first lock position.

* * * * *